United States Patent
Roth et al.

(10) Patent No.: US 9,762,577 B2
(45) Date of Patent: *Sep. 12, 2017

(54) MUTUAL AUTHENTICATION WITH SYMMETRIC SECRETS AND SIGNATURES

(71) Applicant: Amazon Technologies, Inc., Seattle, WA (US)

(72) Inventors: Gregory Branchek Roth, Seattle, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,707

(22) Filed: Jan. 21, 2016

(65) Prior Publication Data

US 2016/0156626 A1 Jun. 2, 2016

Related U.S. Application Data

(63) Continuation of application No. 14/316,684, filed on Jun. 26, 2014, now Pat. No. 9,258,117.

(51) Int. Cl.
*H04L 29/06* (2006.01)
*H04L 9/08* (2006.01)
(Continued)

(52) U.S. Cl.
CPC ........ *H04L 63/0869* (2013.01); *H04L 9/0861* (2013.01); *H04L 9/14* (2013.01); *H04L 9/321* (2013.01); *H04L 9/3247* (2013.01); *H04L 9/3273* (2013.01); *H04L 63/061* (2013.01); *H04L 63/123* (2013.01); *H04L 63/166* (2013.01); *H04L 9/32* (2013.01)

(58) Field of Classification Search
CPC ........ H04L 9/3247; H04L 9/0861; H04L 9/32
See application file for complete search history.

(56) References Cited

U.S. PATENT DOCUMENTS 5,179,591 A  1/1993 Hardy et al.
5,200,999 A  4/1993 Matyas et al.
(Continued)

FOREIGN PATENT DOCUMENTS

WO  WO2006077822  7/2006
WO  WO2008024705  2/2008
WO  WO2014063361  5/2014

OTHER PUBLICATIONS

International Search Report and Written Opinion mailed Aug. 16, 2016, International Patent Application No. PCT/US2016/037427, filed Jun. 14, 2016.

(Continued)

*Primary Examiner* — Ali Shayanfar
(74) *Attorney, Agent, or Firm* — Davis Wright Tremaine LLP

(57) ABSTRACT

A client and server negotiate a secure communication channel using a pre-shared key where the server, at the time the negotiation initiates, lacks access to the pre-shared key. The server obtains the pre-shared key from another server that shares a secret with the client. A digital signature or other authentication information generated by the client may be used to enable the other server to determine whether to provide the pre-shared key.

20 Claims, 10 Drawing Sheets

(51) Int. Cl.
*H04L 9/32* (2006.01)
*H04L 9/14* (2006.01)

(56) References Cited

U.S. PATENT DOCUMENTS

| | | | |
|---|---|---|---|
| 5,497,421 A | 3/1996 | Kaufman et al. | |
| 6,084,969 A | 7/2000 | Wright et al. | |
| 6,097,817 A | 8/2000 | Bilgic et al. | |
| 6,185,316 B1 | 2/2001 | Buffam | |
| 6,453,416 B1 | 9/2002 | Epstein | |
| 6,826,686 B1 | 11/2004 | Peyravian et al. | |
| 6,836,765 B1 | 12/2004 | Sussman | |
| 6,851,054 B2 | 2/2005 | Wheeler et al. | |
| 6,957,393 B2 | 10/2005 | Fano et al. | |
| 6,959,394 B1 | 10/2005 | Brickell et al. | |
| 6,985,583 B1 | 1/2006 | Brainard et al. | |
| 7,010,689 B1 | 3/2006 | Matyas et al. | |
| 7,073,195 B2 | 7/2006 | Brickell et al. | |
| 7,139,917 B2 | 11/2006 | Jablon | |
| 7,146,505 B1 | 12/2006 | Harada et al. | |
| 7,228,417 B2 | 6/2007 | Roskind | |
| 7,320,076 B2 | 1/2008 | Caronni | |
| 7,334,125 B1 | 2/2008 | Pellacuru | |
| 7,363,495 B2 | 4/2008 | Felt et al. | |
| 7,512,965 B1 | 3/2009 | Amdur et al. | |
| 7,631,182 B1 | 12/2009 | Droux et al. | |
| 7,685,430 B1 | 3/2010 | Masurkar | |
| 7,721,322 B2 | 5/2010 | Sastry et al. | |
| 7,757,271 B2 | 7/2010 | Amdur et al. | |
| 7,765,584 B2 | 7/2010 | Roskind | |
| 7,836,306 B2 | 11/2010 | Pyle et al. | |
| 7,853,782 B1 | 12/2010 | Geddes | |
| 7,890,767 B2 | 2/2011 | Smith et al. | |
| 7,913,084 B2 | 3/2011 | Medvinsky et al. | |
| 7,917,764 B2 | 3/2011 | Futa | |
| 8,006,289 B2 | 8/2011 | Hinton et al. | |
| 8,024,562 B2 | 9/2011 | Gentry et al. | |
| 8,041,954 B2 | 10/2011 | Plesman | |
| 8,059,820 B2 | 11/2011 | Malaviarachchi et al. | |
| 8,151,116 B2* | 4/2012 | van der Horst | G06F 21/42 705/405 |
| 8,181,035 B1 | 5/2012 | Gutierrez | |
| 8,275,356 B2 | 9/2012 | Hickie | |
| 8,327,128 B1 | 12/2012 | Prince et al. | |
| 8,332,922 B2 | 12/2012 | Dickinson et al. | |
| 8,370,638 B2 | 2/2013 | Duane et al. | |
| 8,386,800 B2 | 2/2013 | Kocher et al. | |
| 8,387,117 B2 | 2/2013 | Eom et al. | |
| 8,418,222 B2 | 4/2013 | Gbadegesin et al. | |
| 8,423,759 B2 | 4/2013 | Moreau | |
| 8,453,198 B2 | 5/2013 | Band et al. | |
| 8,464,058 B1* | 6/2013 | Chen | H04L 9/0844 380/284 |
| 8,464,354 B2 | 6/2013 | Teow et al. | |
| 8,533,772 B2 | 9/2013 | Garg et al. | |
| 8,533,786 B2 | 9/2013 | Chabbewal et al. | |
| 8,543,916 B2 | 9/2013 | Anderson et al. | |
| 8,561,152 B2 | 10/2013 | Novak et al. | |
| 8,621,561 B2 | 12/2013 | Cross et al. | |
| 8,688,813 B2 | 4/2014 | Maes | |
| 8,695,075 B2 | 4/2014 | Anderson et al. | |
| 8,739,308 B1 | 5/2014 | Roth | |
| 8,745,205 B2 | 6/2014 | Anderson et al. | |
| 8,745,394 B1 | 6/2014 | Rahat et al. | |
| 8,776,190 B1 | 7/2014 | Cavage et al. | |
| 8,776,204 B2* | 7/2014 | Faynberg | G06F 21/31 709/217 |
| 8,782,774 B1 | 7/2014 | Pahl et al. | |
| 8,799,641 B1 | 8/2014 | Seidenberg et al. | |
| 8,856,869 B1 | 10/2014 | Brinskelle | |
| 8,868,923 B1 | 10/2014 | Hamlet et al. | |
| 8,892,865 B1* | 11/2014 | Roth | G06F 21/602 713/150 |
| 8,996,873 B1 | 3/2015 | Pahl et al. | |
| 9,002,018 B2 | 4/2015 | Wilkins et al. | |
| 9,553,856 B2 | 1/2017 | Pahl et al. | |
| 2001/0008013 A1 | 7/2001 | Johnson et al. | |
| 2001/0018739 A1 | 8/2001 | Anderson et al. | |
| 2002/0016840 A1 | 2/2002 | Herzog et al. | |
| 2002/0067832 A1 | 6/2002 | Jablon | |
| 2002/0112181 A1 | 8/2002 | Smith | |
| 2002/0161723 A1 | 10/2002 | Asokan et al. | |
| 2002/0161998 A1 | 10/2002 | Cromer et al. | |
| 2002/0162019 A1 | 10/2002 | Berry et al. | |
| 2002/0194483 A1 | 12/2002 | Wenocur et al. | |
| 2002/0198848 A1 | 12/2002 | Michener | |
| 2003/0016826 A1 | 1/2003 | Asano et al. | |
| 2003/0041110 A1 | 2/2003 | Wenocur et al. | |
| 2003/0135740 A1 | 7/2003 | Talmor et al. | |
| 2003/0145197 A1 | 7/2003 | Lee et al. | |
| 2003/0149781 A1 | 8/2003 | Yared et al. | |
| 2003/0182431 A1* | 9/2003 | Sturniolo | H04L 63/0272 709/227 |
| 2003/0188117 A1 | 10/2003 | Yoshino et al. | |
| 2004/0078593 A1 | 4/2004 | Hind et al. | |
| 2004/0088260 A1 | 5/2004 | Foster et al. | |
| 2004/0103096 A1 | 5/2004 | Larsen | |
| 2004/0128505 A1 | 7/2004 | Larsen | |
| 2004/0128510 A1 | 7/2004 | Larsen | |
| 2004/0131185 A1 | 7/2004 | Kakumer | |
| 2004/0143733 A1 | 7/2004 | Ophir et al. | |
| 2004/0158734 A1 | 8/2004 | Larsen | |
| 2004/0172535 A1 | 9/2004 | Jakobsson et al. | |
| 2004/0243978 A1 | 12/2004 | Walmsley | |
| 2005/0036611 A1 | 2/2005 | Seaton et al. | |
| 2005/0043999 A1 | 2/2005 | Ji et al. | |
| 2005/0050362 A1 | 3/2005 | Peles | |
| 2005/0060580 A1 | 3/2005 | Chebolu et al. | |
| 2005/0080914 A1 | 4/2005 | Lerner et al. | |
| 2005/0120213 A1* | 6/2005 | Winget | H04L 63/0442 713/171 |
| 2005/0132192 A1 | 6/2005 | Jeffries et al. | |
| 2005/0132215 A1 | 6/2005 | Wang et al. | |
| 2005/0144437 A1 | 6/2005 | Ransom et al. | |
| 2005/0166263 A1 | 7/2005 | Nanopoulos et al. | |
| 2005/0223216 A1 | 10/2005 | Chan et al. | |
| 2005/0235148 A1 | 10/2005 | Scheidt et al. | |
| 2005/0273862 A1 | 12/2005 | Benaloh et al. | |
| 2005/0278547 A1 | 12/2005 | Hyndman et al. | |
| 2006/0070116 A1 | 3/2006 | Park | |
| 2006/0075462 A1 | 4/2006 | Golan et al. | |
| 2006/0094406 A1 | 5/2006 | Cortegiano | |
| 2006/0094410 A1 | 5/2006 | Cortegiano | |
| 2006/0100928 A1 | 5/2006 | Waleczak, Jr. et al. | |
| 2006/0130100 A1 | 6/2006 | Pentland | |
| 2006/0149677 A1 | 7/2006 | Shahine et al. | |
| 2006/0174125 A1 | 8/2006 | Brookner | |
| 2006/0190331 A1 | 8/2006 | Tollinger et al. | |
| 2006/0206440 A1 | 9/2006 | Anderson et al. | |
| 2006/0206925 A1 | 9/2006 | Dillaway et al. | |
| 2006/0218625 A1 | 9/2006 | Pearson et al. | |
| 2006/0230284 A1 | 10/2006 | Fiske | |
| 2006/0256961 A1 | 11/2006 | Brainard et al. | |
| 2006/0271785 A1 | 11/2006 | Holtmanns et al. | |
| 2006/0282878 A1 | 12/2006 | Stanley et al. | |
| 2006/0294366 A1 | 12/2006 | Nadalin et al. | |
| 2007/0005955 A1 | 1/2007 | Pyle et al. | |
| 2007/0033396 A1 | 2/2007 | Zhang et al. | |
| 2007/0037552 A1 | 2/2007 | Lee et al. | |
| 2007/0061571 A1 | 3/2007 | Hammes et al. | |
| 2007/0061885 A1 | 3/2007 | Hammes et al. | |
| 2007/0074282 A1 | 3/2007 | Black et al. | |
| 2007/0136361 A1 | 6/2007 | Lee et al. | |
| 2007/0157309 A1 | 7/2007 | Bin et al. | |
| 2007/0174614 A1 | 7/2007 | Duane et al. | |
| 2007/0186102 A1 | 8/2007 | Ng | |
| 2007/0204160 A1 | 8/2007 | Chan et al. | |
| 2007/0206537 A1* | 9/2007 | Cam-Winget | H04L 63/162 370/331 |
| 2007/0234410 A1 | 10/2007 | Geller | |
| 2007/0250706 A1 | 10/2007 | Oba | |
| 2007/0271606 A1* | 11/2007 | Amann | H04W 12/02 726/15 |
| 2007/0277231 A1 | 11/2007 | Medvinsky et al. | |

(56) References Cited

U.S. PATENT DOCUMENTS

| | | |
|---|---|---|
| 2008/0010665 A1 | 1/2008 | Hinton et al. |
| 2008/0022374 A1* | 1/2008 | Brown ............... H04L 9/321 726/5 |
| 2008/0040773 A1 | 2/2008 | AlBadarin et al. |
| 2008/0066150 A1 | 3/2008 | Lim |
| 2008/0080718 A1 | 4/2008 | Meijer et al. |
| 2008/0083036 A1 | 4/2008 | Ozzie et al. |
| 2008/0163337 A1 | 7/2008 | Tuliani et al. |
| 2008/0168530 A1 | 7/2008 | Kuehr-McLaren et al. |
| 2008/0182592 A1 | 7/2008 | Cha et al. |
| 2008/0222694 A1 | 9/2008 | Nakae |
| 2008/0301444 A1 | 12/2008 | Kim et al. |
| 2008/0301630 A1 | 12/2008 | Arnold et al. |
| 2008/0313719 A1 | 12/2008 | Kaliski, Jr. et al. |
| 2009/0013402 A1 | 1/2009 | Plesman |
| 2009/0019134 A1 | 1/2009 | Bellifemine et al. |
| 2009/0049518 A1 | 2/2009 | Roman et al. |
| 2009/0106557 A1 | 4/2009 | Leonard |
| 2009/0132808 A1 | 5/2009 | Baentsch et al. |
| 2009/0172793 A1 | 7/2009 | Newstadt et al. |
| 2009/0183225 A1* | 7/2009 | Malakapalli ......... G06F 21/335 726/1 |
| 2009/0210712 A1 | 8/2009 | Fort |
| 2009/0217385 A1 | 8/2009 | Teow et al. |
| 2009/0254572 A1 | 10/2009 | Redlich et al. |
| 2009/0320093 A1 | 12/2009 | Glazier et al. |
| 2010/0017603 A1 | 1/2010 | Jones |
| 2010/0037304 A1 | 2/2010 | Canning et al. |
| 2010/0058060 A1 | 3/2010 | Schneider |
| 2010/0058072 A1 | 3/2010 | Teow et al. |
| 2010/0071056 A1 | 3/2010 | Cheng |
| 2010/0083001 A1 | 4/2010 | Shah et al. |
| 2010/0111296 A1 | 5/2010 | Brown et al. |
| 2010/0125894 A1 | 5/2010 | Yasrebi et al. |
| 2010/0131756 A1 | 5/2010 | Schneider |
| 2010/0142704 A1 | 6/2010 | Camenisch et al. |
| 2010/0205649 A1 | 8/2010 | Becker et al. |
| 2010/0239095 A1 | 9/2010 | Carter et al. |
| 2010/0251347 A1 | 9/2010 | Roskind |
| 2010/0269156 A1 | 10/2010 | Hohlfeld et al. |
| 2010/0290476 A1 | 11/2010 | Brindle et al. |
| 2010/0299525 A1 | 11/2010 | Shah et al. |
| 2010/0332845 A1 | 12/2010 | Asaka |
| 2011/0004753 A1 | 1/2011 | Gomi et al. |
| 2011/0010538 A1 | 1/2011 | Falk et al. |
| 2011/0035593 A1 | 2/2011 | Pyle et al. |
| 2011/0055562 A1 | 3/2011 | Adelman et al. |
| 2011/0055585 A1 | 3/2011 | Lee |
| 2011/0078107 A1 | 3/2011 | Almeida et al. |
| 2011/0083015 A1 | 4/2011 | Meier |
| 2011/0087882 A1 | 4/2011 | Kuo et al. |
| 2011/0099362 A1 | 4/2011 | Haga et al. |
| 2011/0131415 A1 | 6/2011 | Schneider |
| 2011/0138192 A1 | 6/2011 | Kocher et al. |
| 2011/0167479 A1 | 7/2011 | Maes |
| 2011/0179469 A1 | 7/2011 | Blinn et al. |
| 2011/0185181 A1* | 7/2011 | Lin ................. H04L 63/08 713/176 |
| 2011/0231940 A1 | 9/2011 | Perumal et al. |
| 2011/0239283 A1* | 9/2011 | Chern ............... G06F 21/33 726/6 |
| 2011/0252229 A1 | 10/2011 | Belenkiy et al. |
| 2011/0265172 A1 | 10/2011 | Sharma et al. |
| 2011/0296497 A1 | 12/2011 | Becker |
| 2011/0311055 A1 | 12/2011 | Parann-Nissany |
| 2011/0320606 A1 | 12/2011 | Madduri et al. |
| 2012/0017095 A1* | 1/2012 | Blenkhorn ......... G06F 21/602 713/189 |
| 2012/0020474 A1 | 1/2012 | Kudoh et al. |
| 2012/0023334 A1 | 1/2012 | Brickell et al. |
| 2012/0036551 A1 | 2/2012 | Le Saint et al. |
| 2012/0054625 A1 | 3/2012 | Pugh et al. |
| 2012/0060035 A1 | 3/2012 | Kalmady et al. |
| 2012/0106735 A1 | 5/2012 | Fukuda |
| 2012/0110636 A1 | 5/2012 | Van Biljon et al. |
| 2012/0144034 A1 | 6/2012 | McCarty |
| 2012/0159577 A1 | 6/2012 | Belinkiy et al. |
| 2012/0166818 A1 | 6/2012 | Orsini et al. |
| 2012/0233216 A1 | 9/2012 | Lim |
| 2012/0243687 A1 | 9/2012 | Li et al. |
| 2012/0245978 A1 | 9/2012 | Jain et al. |
| 2012/0265690 A1 | 10/2012 | Bishop et al. |
| 2012/0317414 A1 | 12/2012 | Glover |
| 2013/0031255 A1 | 1/2013 | Maloy et al. |
| 2013/0080769 A1* | 3/2013 | Cha ................. H04L 63/168 713/155 |
| 2013/0086662 A1 | 4/2013 | Roth |
| 2013/0086663 A1 | 4/2013 | Roth et al. |
| 2013/0111217 A1 | 5/2013 | Kopasz et al. |
| 2013/0132232 A1 | 5/2013 | Pestoni et al. |
| 2013/0145447 A1 | 6/2013 | Maron |
| 2013/0166918 A1 | 6/2013 | Shahbazi et al. |
| 2013/0191884 A1 | 7/2013 | Leicher et al. |
| 2013/0198519 A1 | 8/2013 | Marien |
| 2013/0212390 A1 | 8/2013 | Du et al. |
| 2013/0219189 A1* | 8/2013 | Simmons ............. G06F 21/00 713/189 |
| 2013/0254536 A1* | 9/2013 | Glover ............... G06F 21/6209 713/165 |
| 2013/0282461 A1 | 10/2013 | Ovick et al. |
| 2013/0318347 A1 | 11/2013 | Moffat |
| 2013/0318630 A1 | 11/2013 | Lam |
| 2014/0013409 A1 | 1/2014 | Halageri |
| 2014/0053241 A1 | 2/2014 | Norrman et al. |
| 2014/0068252 A1 | 3/2014 | Maruti et al. |
| 2014/0082715 A1 | 3/2014 | Grajek et al. |
| 2014/0122866 A1 | 5/2014 | Haeger et al. |
| 2014/0181925 A1 | 6/2014 | Smith |
| 2014/0189808 A1 | 7/2014 | Mahaffey et al. |
| 2014/0208408 A1 | 7/2014 | Bilgen et al. |
| 2014/0237614 A1 | 8/2014 | Irvine |
| 2014/0281477 A1 | 9/2014 | Nayshtut et al. |
| 2014/0281487 A1 | 9/2014 | Klausen et al. |
| 2014/0283000 A1 | 9/2014 | Radhakrishnan |
| 2015/0082039 A1 | 3/2015 | Stalzer et al. |
| 2015/0089614 A1 | 3/2015 | Mathew et al. |
| 2015/0095648 A1* | 4/2015 | Nix ................. H04W 52/0235 713/170 |
| 2015/0106624 A1 | 4/2015 | Gero et al. |

OTHER PUBLICATIONS

Amazon, "Amazon Prime Video—security considerations," Amazon.com General Help Forum, http://www.amazon.com/gp/help/customer/forums?ie=UTF8&cdForum=Fx2NFGOONPZEXIP&cdPage=1&cdSort=newest&cdThread=Tx18VZVGGU0Y32, latest reply Jun. 17, 2013, 3 pages.

Badra et al., "Key-Exchange Authentication Using Shared Secrets," IEEE Mar. 2006, 39(3):58-66.

Berners-Lee et al., "Uniform Resource Identifier (URI): Generic Syntax," Network Working Group Request for Comments: 3986, The Internet Society 2005, retrieved on Nov. 30, 2011, from http://www.ietf.org/rfc/rfc3986.txt.

Blake-Wilson et al., "Elliptic Curve Crypotgraphy (ECC) Cipher Suites for Transport Layer Security (TLS)," The Internet Society, Network Working Group Request for Comments: 4492, Category: Informational, May 2006, pp. 1-35.

Blake-Wilson et al., "Transport Later Security (TLS) Extensions," The Internet Society, Network Working Group Request for Comments: 4366, Category: Standards Track, Apr. 2006, pp. 1-30.

Blake-Wilson et al., "Transport Layer Security (TLS) Extensions," The Internet Society, Network Working Group Request for Comments: 3546, Category: Standards Track, Jun. 2003, pp. 1-29.

Blumenthal et al., "Pre-Shared Key (PSK) Ciphersuites with NULL Encryption for Transport Layer Security (TLS)," The IETF Trust, Network Working Group Request for Comments: 4785, Category: Standards Track, Jan. 2007, pp. 1-5.

Brown et al., "Transport Layer Security (TLS) Authorization Extensions," Internet Engineering Task Force (IETF) Request for Comments: 5246, Cateogry: Experimental, May 2010, 19 pages.

(56) References Cited

OTHER PUBLICATIONS

Chown et al., "Advanced Ecryption Standard (AES) Ciphersuites for Transport Layer Security (TLS)," The Internet Society, Network Working Group Request for Comments: 3268, Category: Standards Track, Jun. 2002, 7 pages.
Dierks et al., "The TLS Protocol: Version 1.0," The Internet Society, Network Working Group Request for Comments: 2246, Category: Standards Track, Jan. 1999, 80 pages.
Dierks et al., "The Transport Layer Security (TLS) Protocol: Version 1.2," Network Working Group Request for Comments: 5246, Category: Standards Track, Aug. 2008, 104 pages.
Eastlake 3rd, "Transport Layer Security (TLS) Extensions: Extension Definitions," Internet Engineering Task Force (IETF) Request for Comments: 6066, Category: 4366, Jan. 2011, 25 pages.
Eronen et al., "Pre-Shared Key Ciphersuites for Transport Layer Security (TLS)," The Internet Society, Network Working Group Request for Comments: 4279, Cateogry: Standards Track, Dec. 2005, 15 pages.
Ford-Hutchinson et al., "Securing FTP with TLS," The Internet Society, Network Working Group Request for Comments: 4217, Oct. 2005, 29 pages.
Friend et al., "Transport Layer Security (TLS) Protocol Compression Using Lempel-Ziv-Stac (LZS)," The Internet Society, Network Working Group Request for Comments: 3943, Nov. 2004, 13 pages.
Ghorbei-Talbi et al., "Managing Delegation in Access Control Models," International Conference on Advanced Computing and Communications, pp. 744-751, Dec. 18-21, 2007.
Gutmann et al., "Encrypt-then-MAC for Transport Layer Security (TLS) and Datagram Transport Layer Security (DTLS)," IETF Trust, Internet Engineering Taskforce (IETF) Request for Comments: 7366, Category: Standards Track, Sep. 2014, 7 pages.
Hoffman et al., "SMTP Service Extension for Secure SMTP over Transport Layer Security," The Internet Society, Network Working Group Request for Comments: 3207, Category: Standards Track, Feb. 2002, 9 pages.
International Search Report and Written Opinion mailed Dec. 30, 2014, in International Patent Application No. PCT/US2014/057043, filed Sep. 23, 2014.
International Search Report and Written Opinion mailed Dec. 30, 2014, in International Patent Application No. PCT/US2014/057051, filed Sep. 23, 2014.
International Search Report and Written Opinion mailed Oct. 22, 2014, International Patent Application No. PCT/US2014/042569, filed Jun. 16, 2014.
Kanno et al., "Addition of the Camellia Cipher Suites to Transport Layer Security (TLS)," IETF Trust, Internet Engineering Task Force (IETF) Request for Comments: 6367, Category: Informational, Sep. 2011, 8 pages.
Kato et al., "Camellia Cipher Suites for TLS," Ietf Trust, Internet Engineering Task Force (IETF) Request for Comments: 5932, Category: 4132, Category: Standards Track, Jun. 2010, 6 pages.
Khare et al., "Upgrading to TLS Within HTTP/1.1," The Internet Society, Networking Working Group Request for Comments: 2817, Category: Standards Track, May 2000, 13 pages.
Kim et al., "Addition of the ARIA Cipher Suites to Transport Layer Security (TLS)," IETF Trust, Internet Engineering Task Force (IETF) Request for Comments: 6209, Category: Informational, Apr. 2011, 9 pages.
Krawczyk et al., "HMAC: Keyed-Hashing for Message Authentication," Internet Engineering Task Force (IETF) Request for Comments: 2104, Feb. 1997, retrieved Jan. 22, 2015, from https://tols.ietf.org/html/rfc2104, pp. 1-11.
Lee et al., "Addition of the SEED Cipher Suites to Transport Layer Security (TLS)," The Internet Society, Network Working Group Request for Comments: 4162, Category: Standards Track, Aug. 2005, 6 pages.
Liscano et al., "A Context-based Delegation Access Control Model for Pervasive Computing," 21st International Conference on Advanced Information Networking and Applications Workshops 2:44-51, May 21-23, 2007.
Massachusetts Institute of Technology, "Kerberos V5 Installation Guide [online]," May 2012, retrieved on Jun. 27, 2012, from http://web.mit.edu/kerberos/krb5-1.10/krb5-1.10.2/doc/krb5-install.htm, 65 pages.
Massachusetts Institute of Technology, "Kerberos V5 System Administrator's Guide [online]," May 2012, retrieved on Jun. 27, 2012, from http://web.mit.edu/kerberos/krb5-1.10/krb5-1.10.2/doc/krb5-admin.html, 57 pages.
Massachusetts Institute of Technology, "Kerberos V5 UNIX User's Guide," May 2012, retrieved on Jun. 28, 2012, from http://web.mit.edu/kerberos/krb5-1.10/krb5-1.10.2/doc/krb5-user.html, 38 pages.
Mavrogiannopolous et al., "Using OpenPGP Keys for Transport Layer Security (TLS) Authentication," IETF Trust, Internet Engineering Task Force (IETF) Request for Comments: 6091, Category: Informational, Feb. 2011, 9 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Network Working Group Request for Comments: 5081, Category: Experimental, Nov. 2007, 8 pages.
McGrew et al., "AES-CCM Cipher Suties for Transport Layer Security (TLS)," IETF Trust, Internet Engineering Task Force (IETF) Request for Comments: 6655, Category: Standards Track, Jul. 2012, 8 pages.
McGrew et al., "Datagram Transport Layer Security (DTLS) Extension to Establish Keys for the Secure Real-time Transport Protocol (SRTP)," IETF Trust, Internet Engineering Task Force (IETF) Request for Comments: 5764, May 2010, 26 pages.
Medvinsky et al., "Addition of Kerberos Cipher Suites to Transport Layer Security (TLS)," The Internet Society, Network Working Group Request for Comments: 2712, Category: Standards Track, Oct. 1999, 7 pages.
Merkle et al., "Elliptic Curve Cryptography (ECC) Brainpool Curves for Transport Layer Security (TLS)," IETF Trust, Internet Engineering Task Force (IETF) Request for Comments: 7027, Category: Informational, Oct. 2013, 10 pages.
Moriai et al., "Addition of Camellia Cipher Suites to Transport Layer Security (TLS)," The Internet Society, Network Working Group Request for Comments: 4132, Category: Standards Track, Jul. 2005, 7 pages.
Newman, "Using TLS with IMAP, POP3, and ACAP," The Internet Society, Network Working Group Request for Comments: 2595, Category: Standards Track, Jun. 1999, 15 pages.
Patent Cooperation Treaty, "Notification of Transmittal of the International Search Report and the Written Opinion of the International Searching Authority, or the Declaration," issued to International Application No. PCT/US2012/058083 on Dec. 27, 2012.
Phelan et al., "Datagram Transport Layer Security (DTLS) over the Datagram Congestion Control Protovol (DCCP)," Network Working Group Request for Comments: 5238, Category: Standards Track, May 2008, 10 pages.
Rescorla et al., "Datagram Transport Layer Security Version 1.2," IETF Trust, Internet Engineering Task Force (IETF) Request for Comments: 6347, Category: Standards Track, Jan. 2012, 32 pages.
Rescorla et al., "Datagram Transport Layer Security," The Internet Society, Network Working Group Request for Comments: 4347, Category: Standards Track, Apr. 2006, 25 pages.
Rescorla et al., "HTTP Over TLS," The Internet Society, Network Working Group Request for Comments: 2818, Category: Informational, May 2000, 7 pages.
Rescorla et al., "TLS Elliptic Curve Cipher Suites with SHA-256/384 and AES Galois Counter Mode (GCM)," Network Working Group Request for Comments: 5289, Category: Informational, Aug. 2008, 6 pages.
Rescorla et al., "Transport Layer Security (TLS) Renegotiation Indication Extension," IETF Trust, Internet Engineering Task Force (IETF) Request for Comments: 5746, Category: Standards Track, Feb. 2010, 15 pages.
Roth et al., "Hierarchical Data Access Techniques," U.S. Appl. No. 13/431,882, filed Mar. 27, 2012.

(56) References Cited

OTHER PUBLICATIONS

Salowey et al., "AES Galois Counter Mode (GCM) Cipher Suites for TLS," Network Working Group Request for Comments: 5288, Category: Standards Track, Aug. 2008, 8 pages.
Salowey et al., "Transport Layers Security (TLS) Session Resumption without Server-Side State," Network Working Group Request for Comments: 5077, Category: Standards Track, Jan. 2008, 20 pages.
Salter et al., "Suite B Profil for Transport Layer Security (TLS)," IETF Trust, Internet Engineering Task Force (IETF) Request for Comments: 6460, Category: Informational, Jan. 2012, 14 pages.
Santesson et al., "TLS User Mapping Extension," The Internet Society, Network Working Group Request for Comments: 4681, Category: Standards Track, Oct. 2006, 11 pages.
Santesson, "TLS Handshake Message for Supplemental Data," The Internet Society, Network Working Group Request for Comments: 4680, Category: Standards Track, Sep. 2006, 9 pages.
Simpson, "PPP Challenge Handshake Authentication Protocol (CHAP)," Network Working Group, Aug. 1996, retrieved from internet Jun. 27, 2012, http://etherpad.tools.ietf.org/html/rfc1994, 13 pages.
Taylor et al., "Using the Secure Remote Password (SRP) Protocol for TLS Authentication," Network Working Group Request for Comments: 5054, Category: Informational, Nov. 2007, 24 pages.

TCG Published, "TPM Main Part 1 Design Principles," Specification Version 1.2, Revision 116, Mar. 1, 2011, 184 pages.
TCG Published, "TPM Main Part 2 TPM Structures," Specification Version 1.2, Level 2 Revision 116, Mar. 1, 2011, 202 pages.
TCG Published, "TPM Main Part 3 Commands," Specification Version 1.2, Level 2 Revision 116, Mar. 1, 2011, 339 pages.
Tuexen et al., "Datagram Transport Layer Security (DTLS) for Stream Control Transmission Protocol (SCTP)," IETF Trust, Internet Engineering Task Force (IETF) Request for Comments: 6083, Category: Standards Track, Jan. 2011, 9 pages.
Turner et al., "Prohibiting Secure Sockets Layer (SSL) Version 2.0," IETF Trust, Internet Engineering Task Force (IETF) Request for Comments: 6176, Mar. 2011, 4 pages.
U.S. Appl. No. 13/431,760, filed Mar. 27, 2012.
U.S. Appl. No. 13/431,898, filed Mar. 27, 2012.
Wang et al., "Extending the Security Assertion Markup Language to Support Delegation For Web Services and Grid Services," IEEE International Conference on Web Services 1:67-74, Jul. 11-15, 2005.
Wikipedia, "Physical unclonable function," retrieved Aug. 22, 2013, from http://en.wikipedia.org/wiki/Physical_unclonable_function, 8 pages.
Hollenbeck, "Transport Layer Security Protocol Compression Methods," The Internet Society, Network Working Group Request for Comments: 3749, Category: Standards Track, May 2004, 8 pages.

* cited by examiner

MUTUAL AUTHENTICATION WITH SYMMETRIC SECRETS AND SIGNATURES

CROSS-REFERENCE TO RELATED APPLICATION

This application is a continuation of U.S. patent application Ser. No. 14/316,684, filed Jun. 26, 2014, the disclosure of which is incorporated herein by reference in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many techniques have been developed to enhance data security. For example, transport layer security (TLS) and other protocols allow secure communications over a network between computer systems using symmetric cryptographic keys. Such protocols, however, are often avoided because of the difficulty of storing and distributing the symmetric cryptographic keys in a secure manner. Asymmetric cryptography provides mechanisms for two computer systems to share symmetric cryptographic keys. However, techniques utilizing asymmetric cryptography often rely on certificate authorities which are often operated outside of the control of the entities forming a secure communication. As a result, a compromise to the security of a certificate authority can compromise the security of communications transmitted over communication channels created in reliance on the certificate authority.

BRIEF DESCRIPTION OF THE DRAWINGS

Various embodiments in accordance with the present disclosure will be described with reference to the drawings, in which.

DETAILED DESCRIPTION

Figure 1:
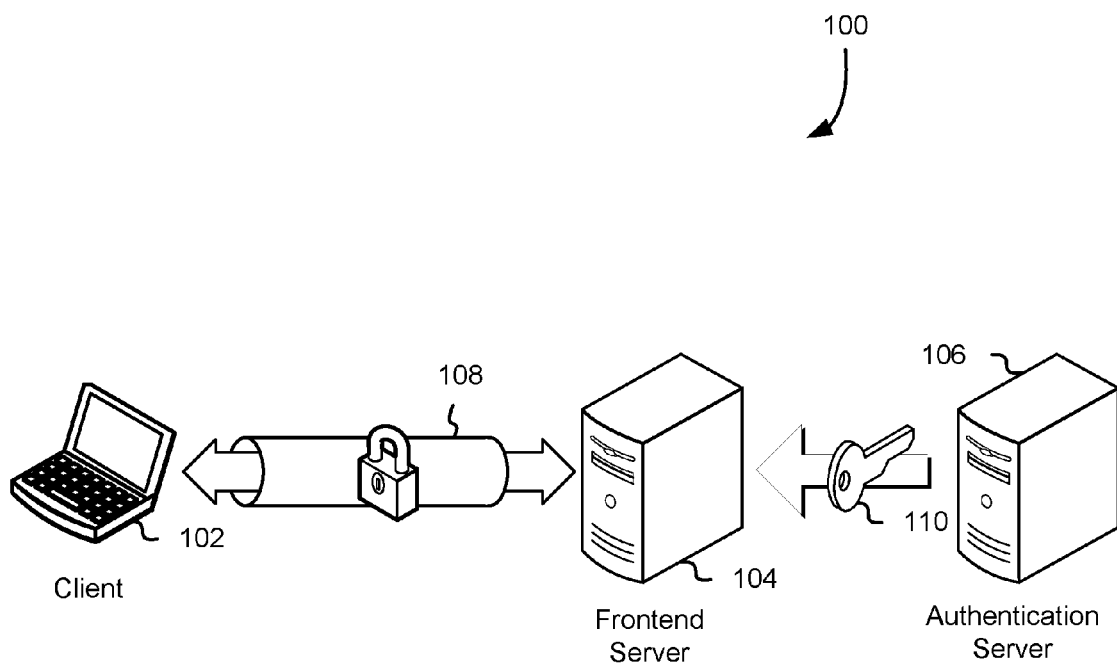
FIG. 1 shows an illustrative example of an environment in which various embodiments may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the establishment of secure communication channels using symmetric secrets. In an embodiment, a client computer system (client) uses a symmetric cryptographic key to establish a secure communication channel with a server computer system (server). At initiation of a process to establish the secure communication channel with the server, the client and the server do not share the secret that is used to establish the secure communication channel. When the client contacts the server to establish the secure communication channel, the server communicates with another server that has access to the cryptographic key. The server with access to the cryptographic key provides the cryptographic key to the server that initially lacked access to the cryptographic key, thereby enabling the server that initially lacked access to the cryptographic key to establish the secure communication channel with the client.

In some embodiments, the client digitally signs a message using a cryptographic key, thereby resulting in a digital signature of the message. The client then transmits the message and the digital signature to a server that lacks access to the cryptographic key. For example, the server lacks access to the cryptographic key because the server does not have available (e.g., in volatile or non-volatile memory) the cryptographic key and/or another cryptographic key necessary to derive the cryptographic key. As the server lacks access to the cryptographic key, the server is unable to verify the digital signature of the message.

Accordingly, in an embodiment, the server transmits the message and the digital signature to an authentication server that does have access to the cryptographic key. The authentication server, having access to the cryptographic key (e.g., either by having available the cryptographic key or being able to derive the cryptographic key) is able to obtain the cryptographic key and use the obtained cryptographic key to verify the digital signature. Contingent on successful verification of the digital signature, the authentication server provides the server a cryptographic key to which the client has access. Once the server shares a cryptographic key with the client, the client and server can establish a secure communication channel.

Various techniques may be applied to enhance security in a system such as described above. For example, in some embodiments, the authentication server uses a cryptographic key shared with the client (i.e., a cryptographic key to which the client has access by either having available the cryptographic key or being able to derive the cryptographic key) to derive another cryptographic key that the client is also able to derive or has already derived. The client and authentication server may each have access to a set of parameters used in deriving the other cryptographic key. For example, a message from the client to the server may encode or otherwise specify an ordered set of derivation parameters (also referred to as a key path or a key derivation path) and that message may be forwarded to the authentication server, thereby ensuring that the client and the authentication server have access to the same set of derivation parameters. In some embodiments, the message specifies multiple key paths, each for a different cryptographic key to be derived from the same root key. As another example, the client and the authentication server may each be configured (e.g., with executable code) to utilize the same set of parameters. In other words, the client and authentication server may operate in accordance with a canonical system that multiple devices in a distributed system are configured to utilize. As yet another example, the client and/or authentication server may obtain the key derivation parameters from another entity. Other variations are also considered as being within the scope of the present disclosure.

By providing the server with a derived cryptographic key that is derived from a cryptographic key shared as a secret between the client and the authentication server, numerous technical advantages are achieved. For example, by providing the server with the derived cryptographic key, the server lacks access to the cryptographic key shared between the authentication server and the client. As a result, if the server is compromised and unauthorized access to and/or use of the derived cryptographic key is achieved by an unauthorized entity, the effect of the compromise does not extend to the cryptographic key used to derive the derived cryptographic key. In a distributed system where a single cryptographic key may be used to derive multiple derived cryptographic keys used in different divisions of the distributed system, compromise of a single key affects only that/those division(s) of the distributed system that utilize(s) that key. As another example, in some embodiments, a server that is able to obtain from another server a symmetric key usable to establish a secure communication channel with a client is able to establish the secure communication channel without use of a digital certificate used with asymmetric cryptography. Consequently, additional precautions needed to protect the integrity of the digital certificate need not be taken. Other advantages will also be apparent to those with skill in the art.

FIG. 1 shows an illustrative example of an environment 100 in which various embodiments may be practiced. In this example, the environment 100 includes a client computing device 102 (also referred to as simply a client 102), a frontend server computer system (also referred to as a server 104) and an authentication server computer system 106 (also referred to as an authentication server 106). The client 102, while illustrated as a notebook computer in FIG. 1, may be any suitable computing device able to communicate over a network with a server. Examples of such computing devices are discussed below and include but are not limited to desktop computers, tablet computers, mobile phones, and other devices with networking capabilities, such as discussed below. Similarly, the frontend server 104 and the authentication server 106 may be implemented by computing devices as described below and may be configured with executable code that enables the computing devices to operate as discussed in more detail herein. In some embodiments, the frontend server 104 and authentication server 106 are implemented using separate computing devices although, in other embodiments, the authentication server 106 and frontend server 104 are implemented on the same computing device, such as in different domains of a hypervisor or simply by different server applications running on the same computing device. Generally, the frontend server 104 and the authentication server 106 may be part of the same computer system, which may be a distributed computer system with multiple devices that communicate over a network.

In an embodiment, the client 102 establishes a secure communication channel 108 with the frontend server 104. As an illustrative example, the secure communication channel 108 may be established using transport layer security protocol such as defined in Request for Comments (RFC) 5246, RFC 2246, RFC 4279, and RFC 6176, which are incorporated herein by reference. Other protocols such as secure sockets layer (SSL) and other protocols implemented below the application layer of the Open Systems Interconnect (OSI) model may also be used and/or adapted to utilize techniques described herein. To establish the secure communication channel 108, the client 102 and the frontend server 104 may utilize a shared cryptographic key that is a cryptographic key accessible to both the client 102 and the frontend server 104. However, when the client 102 initiates communication with the frontend server 104, the frontend server may lack access to such a cryptographic key. Accordingly, as illustrated in FIG. 1, the authentication server 106 may provide a cryptographic key 110 to the frontend server. The cryptographic key 110 may be accessible to the client 102. Thus, upon having been provided the cryptographic key 110, the frontend server 104 is able to use the cryptographic key 110 to establish the secure communication channel 108. As discussed in more detail below, the authentication server 106 may perform additional operations such as operations related to authentication of the client 102.

Figure 2:
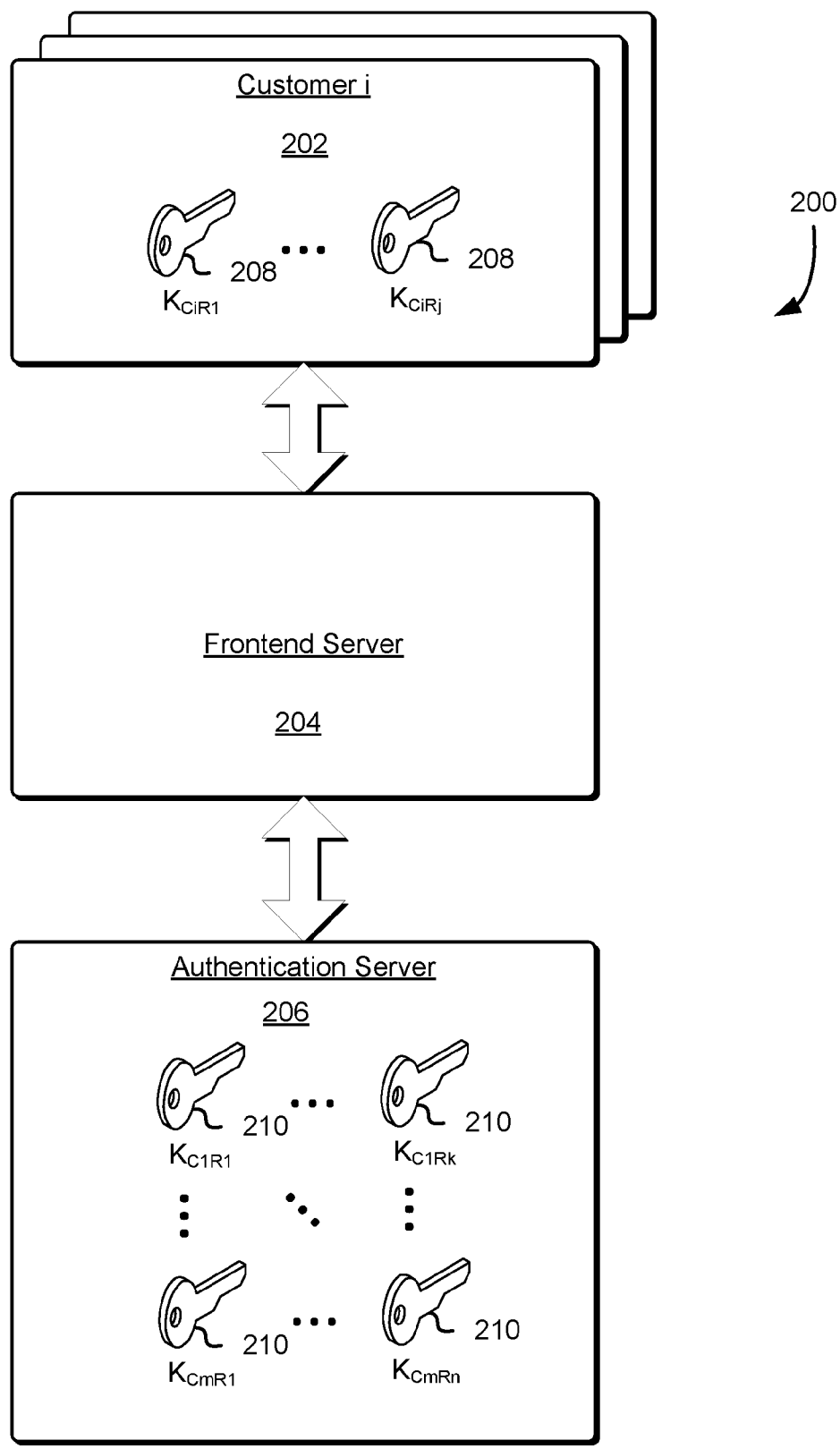
FIG. 2 shows an example diagram illustrating various aspects of the present disclosure.

FIG. 2 shows an illustrative example of an environment 200 in which various embodiments may be implemented. In many respects, the environment 200 is similar to the environment 100 discussed above in connection with FIG. 1. For example, as illustrated in FIG. 2, the environment 200 includes client devices and multiple types of server devices. In this particular example, the environment 200 includes multiple customer computing devices 202, each of which may be a client computing device such as described above in connection with FIG. 1. Similarly, the environment 200 may include a frontend server 204 and an authentication server 206 such as the frontend server 104 and authentication server 106 described above in connection with FIG. 1. While not shown in FIG. 2, an environment such as the environment 200 may include additional devices such as multiple frontend servers 204 and multiple authentication servers 206. Other devices, such as networking equipment, may also be included in the environment 200. In some embodiments, multiple frontend servers and/or multiple authentication servers are behind load balancing computer systems to enable the distribution of load across multiple devices from the customer computing devices 202. Generally, a computer system may comprise the frontend server 204 and authentication server 206 and possibly additional computer systems and, as such, may be a distributed computer system (also referred to as a distributed system). In some embodiments, the computer system (e.g., a distributed computer system) is used to provide one or more services and, in such instances, may be referred to as a service provider computer system.

As illustrated in FIG. 2, individual customer computing devices 202 may include one or more root keys 208 which may be symmetric cryptographic keys (e.g., keys used in symmetric cryptographic algorithms). One or more root keys accessible to a customer computer device 202 may also be accessible to the authentication server 206. As noted in FIG. 2, the authentication server 206 may have multiple root keys 210 for multiple customers of a computing resource service provider for which the frontend server 204 and/or authentication server 206 operate. For a particular customer computing device 202, the authentication server 206 may share all the root keys accessible to the customer computing device 202 or a proper subset thereof. It should be noted that by cryptographic keys being accessible to both a customer computing device 202 and the authentication server 206, the customer computing device 202 and the authentication server 206 do not necessarily need to store copies of the same cryptographic key. As noted, for example, accessibility to a cryptographic key may be the ability to access another cryptographic key from which another cryptographic key can be derived. As illustrated in FIG. 2, the frontend server 204 does not have access to the root keys 208, 210. In some embodiments, the frontend server 204 never has access to the root keys 208, 210, but only cryptographic keys derived from the root keys 208, 210. In this manner, a security compromise of the frontend server 204 does not compromise the root keys 208, 210.

Figure 3:
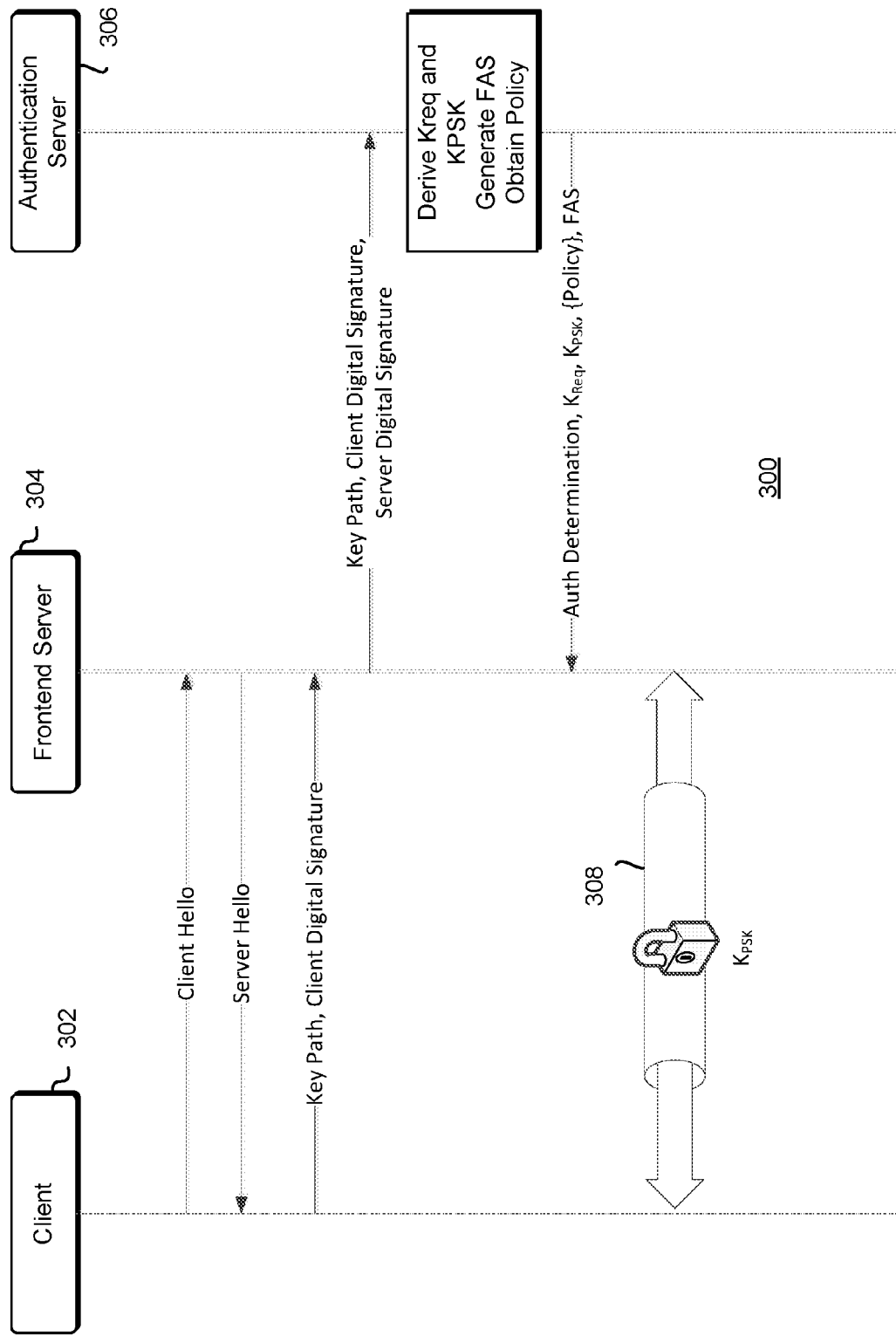
FIG. 3 shows an illustrative example of an information flow diagram illustrating example communications in accordance with at least one embodiment.

FIG. 3 shows a diagram 300 illustrating information flow in accordance with at least one embodiment. The information flow illustrated in FIG. 3 may resemble an adaptation of a TLS-PSK handshake such as described in RFC 4279, which is incorporated herein by reference, although the techniques described herein are adaptable to other protocols and not all possible communications and information passed between computer systems are illustrated for the purpose of avoiding distraction from various techniques described herein. For example, the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake. In the diagram 300, a client 302 communicates with a frontend server 304, which communications with an authentication server 306, where the client 302, frontend server 304, and authentication server 306 may be computer systems such as described above. As illustrated in FIG. 3, the client 302 initiates a communication exchange with the frontend server 304 by transmitting a ClientHello message to the frontend server 304. The frontend server 304 may respond to the ClientHello message by transmitting to the client 302 a ServerHello message.

Various information may be provided in the ClientHello and ServerHello messages. For example, in some embodiments, the ClientHello message specifies a set of cybersuites supported by the client 302. Similarly, the ServerHello message may specify a set of cybersuites supported by the frontend server 304. In this manner, the client 302 and frontend server 304 may agree to a ciphersuite mutually supported by both the client 302 and the frontend server 304. In some embodiments, the ClientHello message specifies a ciphersuite corresponding to an embodiment of the present disclosure. In some embodiments, a server supporting such a ciphersuite is configured to utilize the specified ciphersuite if included in a set of ciphersuites specified in a ClientHello message. Selection of the ciphersuite (or a different ciphersuite) may be specified to the client in the ServerHello message.

Upon receipt of the ServerHello message, the client 302 may transmit a communication to the frontend server 304 that comprises a message specifying a key path. In an embodiment, the key path specifies a set of key derivation parameters usable to derive a pre-shared key, such as described in more detail below, where the key path may specify an ordering of multiple parameters so that, as described below, a different computer system also deriving the pre-shared key will derive the same pre-shared key when output of algorithm for key derivation is dependent on the ordering of the parameters. The communication may also include a digital signature generated by the client 302 generated so as to be verifiable by the authentication server 306. In some embodiments, the digital signature is a digital signature of the message. In other embodiments, the digital signature is generated over multiple messages, such as all messages between the client 302 and the frontend server 304, beginning with the ClientHello message. (In embodiments where the digital signature is calculated over multiple messages, such messages may be stored by the frontend server and provided to the authentication server 306 to enable the authentication server to verify the digital signature).

Having received the communication with the key path and digital signature, the frontend server 304 may forward the communication or information otherwise based at least in part thereon to the authentication server 306. The authentication server 306 may verify the digital signature and, contingent on successful verification of the digital signature, may derive one or more cryptographic keys, where derivation of one or more keys may be made in accordance with one or more key paths specified by the client, where a key path may be used to generate a cryptographic key such as described in more detail below. In this example, the authentication server 306 derives a request key and a pre-shared key. One or more cryptographic keys used to derive the request key and the pre-shared key may be shared with the client 302. That is, the one or more cryptographic keys used to derive the request key and the pre-shared key may be mutually available to both the client 302 and the authentication server 306. The authentication server 306 may also perform other operations such as by generating a forward access session (FAS) and obtaining a set of policies applicable to an entity associated with the client 302. A forward access session may be a credential usable by the frontend server 304 to make application programming interface (API) requests to other services on behalf of a customer associated with the client 302. In some embodiments, the forward access session comprises an encrypted set of information that is cryptographically verifiable to enable another system to determine that the frontend server 304 is authorized to submit API requests on behalf of the customer. For example, the forward access session may be sufficient to prove authorization to perform one or more operations on behalf of the customer associated with the client 302.

Policies may be encodings of permissions (which may be generalized to conditions and effects of fulfillment of conditions) with respect to a system where access is controlled, at least in part, by the authentication server 306. The policies may be encoded in any suitable manner, such as in a declarative access control policy language, such as eXtensible Access Control Markup Language (XACML), Enterprise Privacy Authorization Language (EPAL), Amazon Web Services Access Policy Language, Microsoft SecPol or any suitable way of encoding one or more conditions (e.g., by encoding an access control list (ACL) or portion thereof) that must be satisfied for a data storage operation to be performed.

The request key derived by the authentication server 306 may be a cryptographic key usable to verify digital signatures generated by the client 302 with a copy of the request key. In other words, the request key may be a symmetric cryptographic key, although asymmetric digital signature generation and verification is also considered as being within the scope of the present disclosure. The pre-shared key, denoted $K_{PSK}$, may be a cryptographic key usable to establish a secure communication channel between the client 302 and the frontend server 304. For example, the pre-shared key may be used to generate a premaster secret, which may be used to generate a master secret that is usable to determine a session key in accordance with the TLS protocol (which contains a record protocol and a handshake protocol). In some embodiments, the pre-shared key itself is used as a session key. Generally, using the pre-shared key to establish a secure communication channel may include encrypting data using the pre-shared key or another key derived, at least in part, from the pre-shared key. Generally, any cryptographic key discussed as usable/used/etc. to perform a cryptographic operation (e.g., digital signature generation and/or verification) denotes that the cryptographic key itself or another cryptographic key derived, at least in part, from the cryptographic key is used as input into a cryptographic algorithm for performing the cryptographic operation.

It should be noted that the operations performed by the authentication server 306 are illustrative in nature and variations are considered as being within the scope of the present disclosure. For example, as illustrated in FIG. 3, the authentication server 306 derives both a request key and a pre-shared key. In some embodiments, however, a single cryptographic key may be usable as both a request key and a pre-shared key. Similarly, in some embodiments, an authentication server does not generate a forward access session and/or does not obtain policy applicable by the frontend server. Generally, however, as illustrated in FIG. 3, the information determined by the authentication server 306, such as cryptographic keys, forward access sessions and/or policies, are provided to the frontend server 304.

In the illustrative embodiment shown in FIG. 3, the authentication server 306 provides to the frontend server 304 an authentication determination, which indicates explicitly or implicitly whether the digital signature has been successfully verified, and if the authentication decision indicates successful verification of the digital signature, the authentication server 306 provides the request key, the pre-shared key, any obtained policies, and the forward access session. Upon receipt of the information from the authentication server 306, the frontend server may utilize the information for various purposes. For example, as illustrated in FIG. 3, the frontend server 304 may use the pre-shared key to establish a secure communication channel 308 with the client 302. The request key may be used by the frontend server 304 to verify digital signatures received from the client 302 in future requests such as future requests submitted by the client 302 to the server 306 to establish a secure communication channel after a previous secure communication channel has ended and/or to sign API requests to access one or more computing resources although, in some embodiments, API requests may be unsigned once a secure communication channel has been established and is in use. In this manner, by having available the request key, the frontend server 304 is able to verify digital signatures without additional communications with the authentication server 306 until, for example, the request key expires, where expiration may be triggered by ending of a session that uses the pre-shared key. The policy may be used by the frontend server to evaluate whether to fulfill requests submitted by the client 302 and a forward access session may be used as part of fulfillment of requests submitted by the client 302, such as by using the forward access session to submit requests to other servers on behalf of the client 302.

Figure 4:
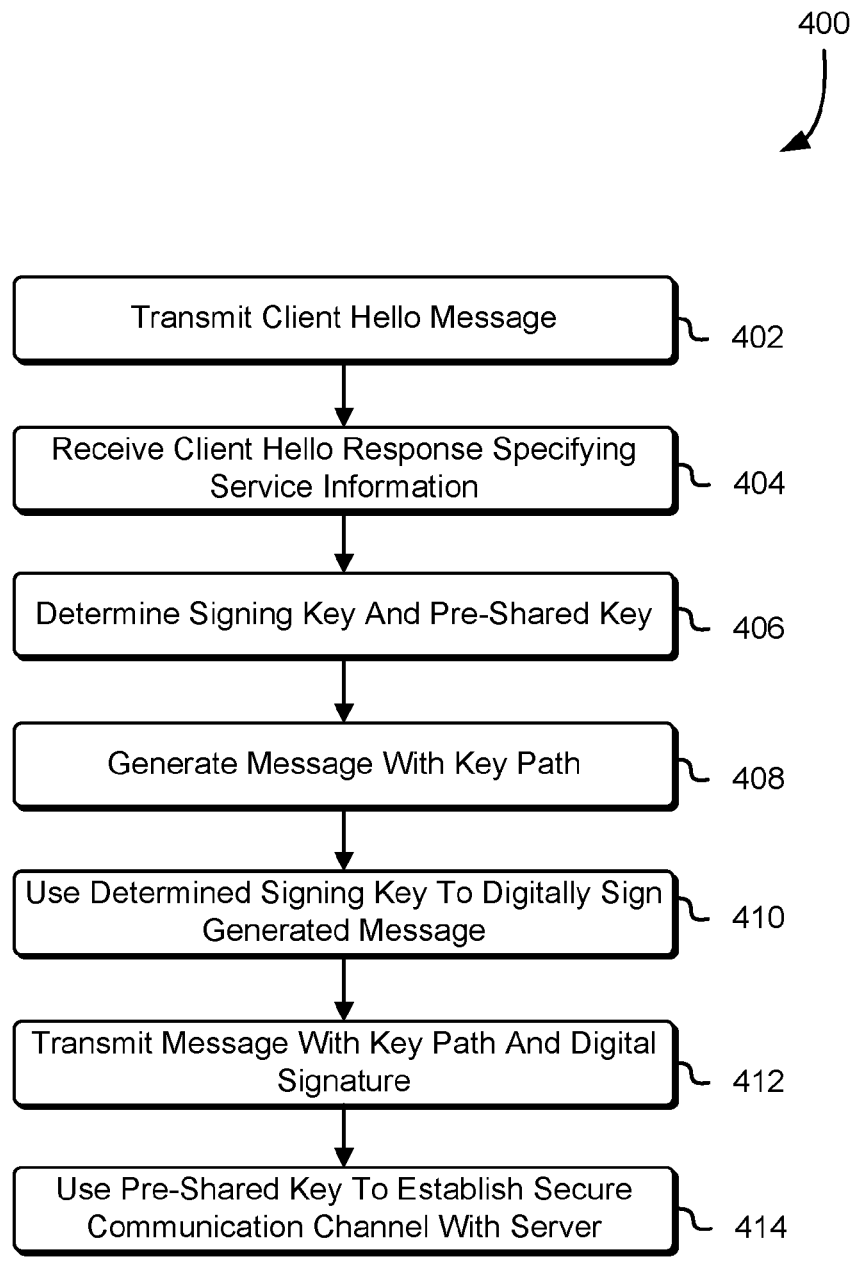
FIG. 4 shows an illustrative example of a process that may be performed by a client computer system in accordance with at least one embodiment.

FIG. 4 shows an illustrative example of a process 400 in which various embodiments may be practiced. The process 400 may be performed by any suitable system, such as by a client computing device such as described above or, generally, any computing device configured to communicate over a network and perform operations, such as described below. In an embodiment, the process 400 includes transmitting 402 a ClientHello message to a server. The ClientHello message may be generated in accordance with a protocol such as TLS. While a ClientHello message and other examples of messages are used throughout for the purpose of illustration, other types of communications are considered as being within the scope of the present disclosure. For example, the ClientHello message may not be a message configured in accordance with TLS, but may be any message configured to begin a negotiation of a secure session with another computer system. Similarly, while FIGS. 3 and 4 show a client initiating the negotiation of a secure session, secure sessions may be initiated by a server computer system. Further, one or more other communications between a client and server (e.g., communications not requiring secure communication) may precede a message initiating a negotiation of a secure session.

Turning to the illustrated embodiment, as shown in FIG. 4, the process 400 may include receiving 404 from the server a ClientHello response (ServerHello message) specifying the service information such as information that describes a service in which the server is a component. The service information may, for example, identify a service that is one of multiple services operated by a computing resource service provider. Other information, such as a region in which the server operates may also be included in the service information. While specific details are not illustrated in the flowchart of FIG. 4, the service information may be used by a system performing the process 400 in its operations. For example, as illustrated in FIG. 4, the process 400 may include determining 406 a signing key and a pre-shared key. In some embodiments, the service information is used to determine at least part of a key path used to derive the signing key and pre-shared key as the key path may be determined by the client using the service information. In some embodiments, the service information is the key path and, variations of such embodiments include ones in which the server provides the key path to the client and the client does not provide the key path to the server. In some examples, both the signing key and the pre-shared key are derived from the same root key although, in other examples, different root keys are used to respectively generate the signing key and the pre-shared key. Further, in some examples, one of the signing key and pre-shared key is derived from the other of the signing key and pre-shared key while, in other examples, neither the signing key nor the pre-shared key is derived from the other of the signing key or pre-shared key. Yet further, in some embodiments, a root key is used as the signing key or pre-shared key. It should be noted that, to determine a cryptographic key in accordance with any of the processes described herein, a computer system may derive or otherwise generate the cryptographic key itself or otherwise obtain the cryptographic key, such as by retrieving a pre-generated cryptographic key from storage or receiving the cryptographic key from another computer system that derived the cryptographic key, either on demand or as a pre-generated cryptographic key that was stored for later access.

As noted above, a single key may be used as a signing key and pre-shared key in some embodiments. As illustrated in FIG. 4, the process 400 includes generating 408 a message with a key path used to generate the pre-shared key. In some embodiments, the message also includes a key path used to generate a signing key, although executable code of the system performing the process 400 and another system that will verify the digital signature may be configured such that transmission of the key path is unnecessary. For example, a client may execute code of a client library of a service provider, where the client library is configured to cause the client to utilize key paths so as to derive cryptographic keys usable in communicating with the server.

The determined signing key may be used 410 to digitally sign the generated message. In some embodiments, for example, a digital signature is generated as output of a hash-based message authentication code algorithm (HMAC) applied to the message and the signing key, although other digital signature techniques are considered as being within the scope of the present disclosure. As another example, another keyed cryptographic hash (e.g., message authentication code (MAC)) of the message may be generated using the message and the signing key. Generally the signing key and generated message may be used to generate information sufficient for verification of authenticity and integrity of the message. Further, as noted, the message may include information such as previous messages that were transmitted in a sequence of communications, such as in accordance with variations of TLS.

The message with the key path and the digital signature may be transmitted 412 to the server, which, as described above and in more detail below, may obtain the pre-shared key such that the system performing the process 400 is able to use 414 the pre-shared key to establish a secure communication channel with the server. As with all processes described herein, variations are considered as being within the scope of the present disclosure. For instance, FIG. 4 shows the signing key and the shared key being determined at a particular point during performance of the process 400. The signing key and pre-shared key may be determined in different places during performance of the process 400 in various embodiments, and generally determination of the signing key and pre-shared key may be done separately or together before the keys are later used.

Figure 5:
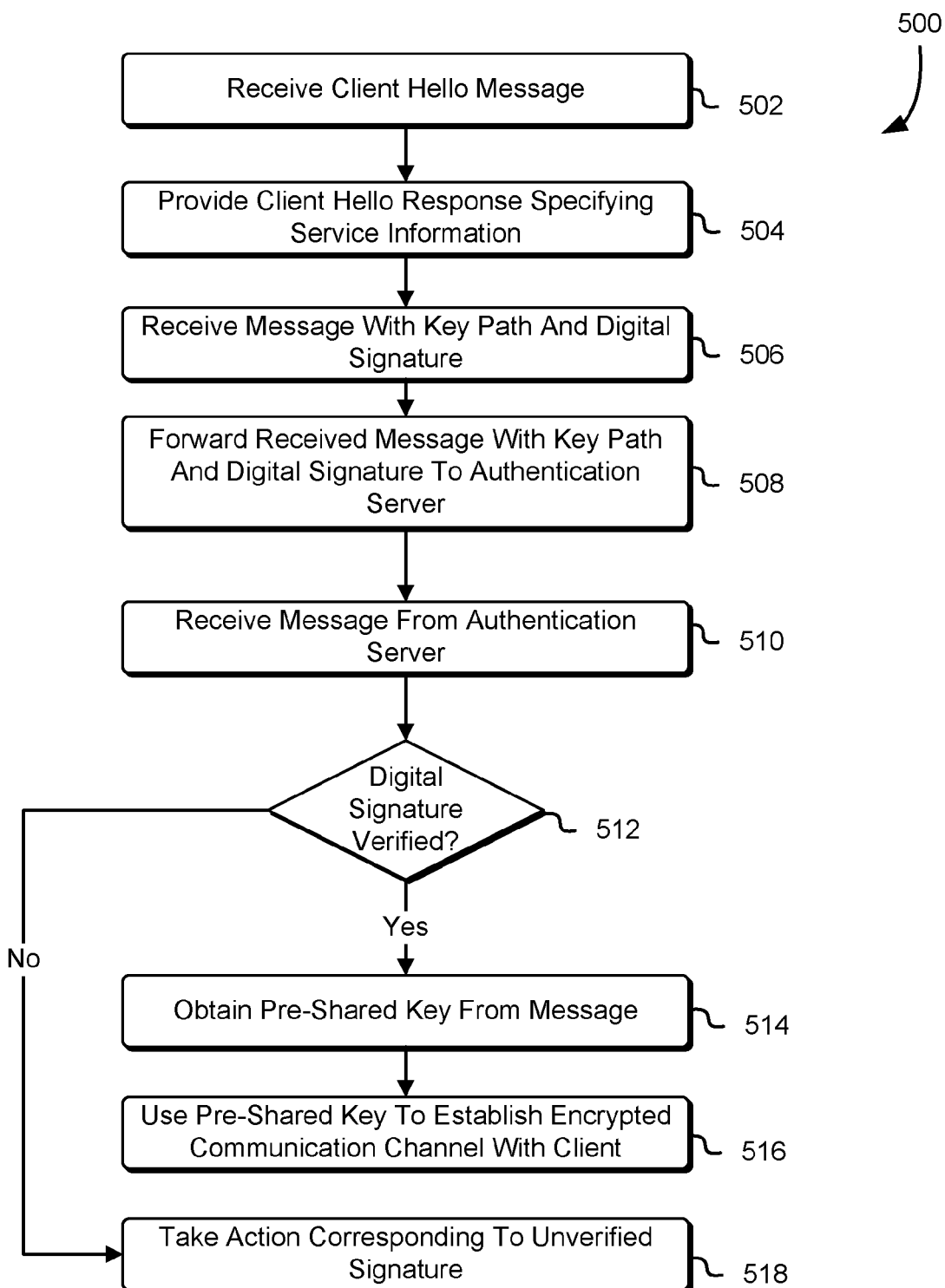
FIG. 5 shows an illustrative example of a process which may be performed by a server computer system in accordance with at least one embodiment.

FIG. 5 shows an illustrative example of a process for establishing a secure communication channel such as described above. The process 500 may be performed by any suitable system, such as by a frontend server described above. In an embodiment, the process 500 includes receiving 502 a ClientHello message. The ClientHello message may have been received, for example, by a system performing the process 400 described above in connection with FIG. 4. Generally the process 500 may be performed as part of interaction with another system performing the process 400 described above in connection with FIG. 4. As illustrated in FIG. 5, in an embodiment, the process 500 includes providing 504 a ClientHello response (ServerHello message) specifying service information, such as described above. The ServerHello message may be provided, for instance, to a client. A message may be received 506 from the client with a digital signature of the message. The received message and digital signature may be forwarded 508 (i.e., transmitted) over a network to an authentication server and a message from the authentication server may be received 510. The message received from the authentication server may be configured such as described above. For example the message may indicate whether the digital signature has been successfully verified by the authentication server and, if so, the message may include further information, such as one or more cryptographic keys, a forward access session, and one or more policies.

Accordingly, the process 500 may include determining 512 from the message received 510 from the authentication server whether the digital signature has been verified. If it is determined 512 the digital signature has been verified, the process 500 may include obtaining 514 a pre-shared key from the message that was received 510 from the authentication server. The pre-shared key may be used 516 to establish an encrypted communication channel with the client such as described above. For example, the encrypted communication channel may be established in accordance with the TLS protocol when both client and server have a pre-shared key. The pre-shared key may, for instance, be used to determine a premaster secret, then a master secret from which a session key is derived. As noted, in some embodiments, the pre-shared key is used as a session key. Further, with respect to client operations, in alternate embodiments, the authentication server may perform some or all of the computations involved in generating a session key from the pre-shared key and, in some examples, the system performing the process does not receive a pre-shared key, but a session key and/or information derived based at least in part on the pre-shared key where the information is usable (e.g., sufficient) to generate the session key.

If, however, it is determined 512 that the digital signature has not been successfully verified by the authentication server, the process 500 may include taking 518 action corresponding to an unverified signature. In some examples, the action that is taken may include ceasing further communication with the client that submitted the ClientHello message that was received 502. As another example, a communication may be made to the client that indicates that the digital signature was unsuccessfully verified or generally indicates that an error has occurred. In yet other examples, the action taken may be a fallback to another mode of operation. For example, other methods of exchanging a pre-shared key, such as those specified in TLS such as a Diffie-Hellman key exchange, may be used to exchange a cryptographic key with the client so that the client and server may each have available a pre-shared key and may establish the encrypted communication channel. Other variations are also considered as being within the scope of the present disclosure.

Figure 6:
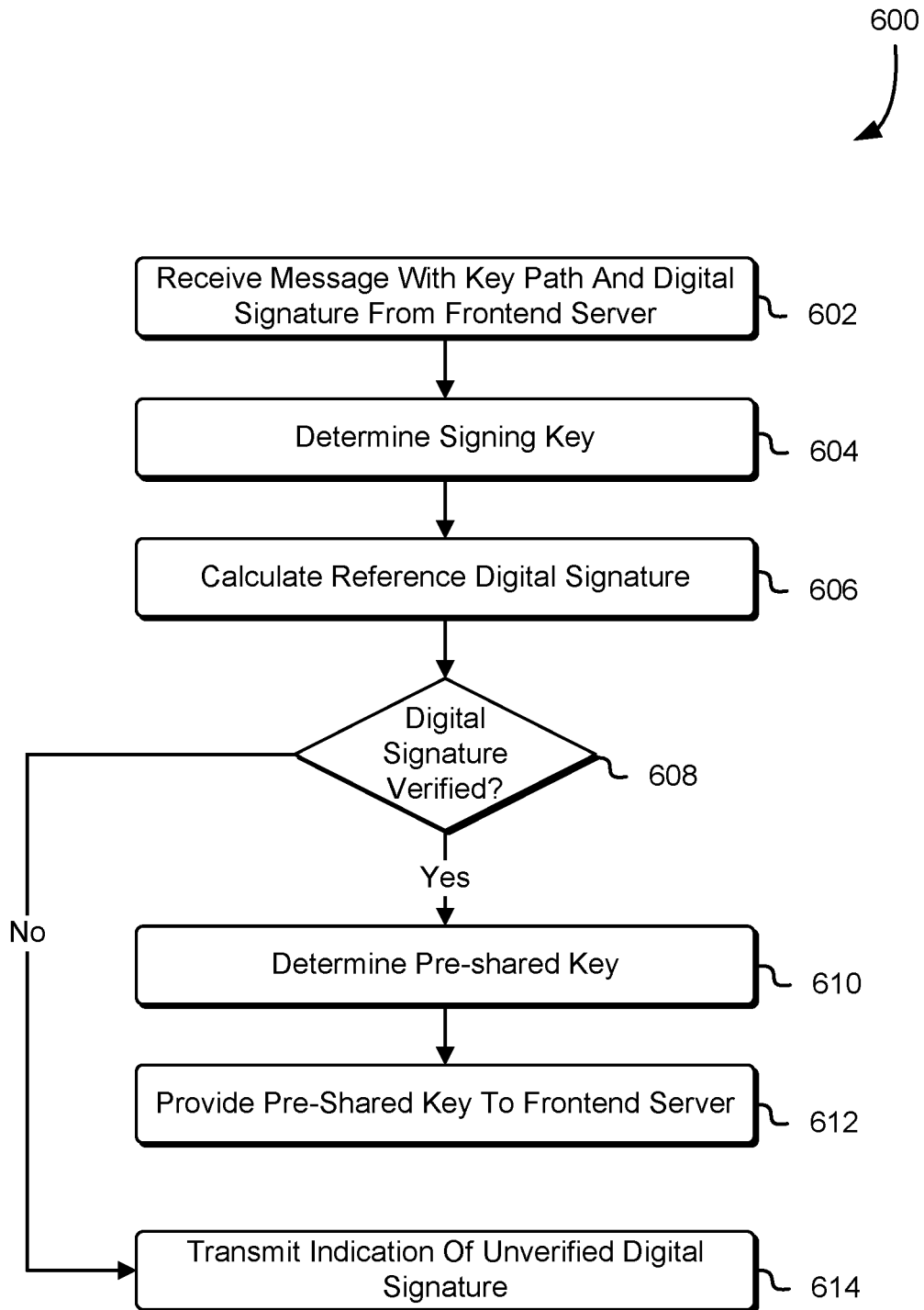
FIG. 6 shows an illustrative example of a process which may be performed by another server in accordance with at least one embodiment.

FIG. 6 shows an illustrative example of a process for participating in a process of establishing a secured communication channel such as described above. The process 600 may be performed by any suitable system, such as by an authentication server such as described above. In an embodiment, the process 600 includes receiving 602 a message with a key path and a digital signature of the message from a front end server such as described above. The message may be received 602 from a server performing the process 500 discussed above in connection with FIG. 5, and generally performance of the process 600 may involve interaction with another system performing the process 500 discussed above in connection with FIG. 5. Having received 602 the message with the digital signature of the message, the process 600 may include determining 604 a signing key. For example, the system performing the process 600 may utilize a key path to determine parameters for deriving the signing key from another cryptographic key that is shared with a client that purportedly generated the digital signature that was received 602.

A referenced digital signature may be calculated 606 using the signing key, and a determination may be made 608 whether the digital signature is verified. For example, a determination whether the digital signature is verified may be determined based on whether the referenced digital signature is equal to or otherwise matches the digital signature received 602 with the message. If it is determined 608 that the digital signature is verified, a pre-shared key may be determined 610. Determining the pre-shared key may include using some or all of the key path that was received 602 to derive the pre-shared key from a cryptographic key shared with a client that purportedly generated the digital signature. The pre-shared key may then be provided 612 to the frontend server from which the message was received 602.

As noted above, a system performing the process 600 may perform additional operations such as generating a request key, generating a forward access session, and/or determining one or more applicable policies, and such additional information may be provided to the frontend server with the pre-shared key. If, however, it is determined 608 that the digital signature is not verified, such as if the referenced digital signature does not match the digital signature that was received 602, an indication of an unverified digital signature may be transmitted 614 to the frontend server, thereby enabling the frontend server to operate accordingly.

As noted, variations of all processes are considered as being within the scope of the present disclosure. For example, performance of the process 500 may also include digitally signing communications to a system performing the process 600. Accordingly, the process 600 may include verifying a digital signature generated by the frontend server and performance of various operations described in connection with FIG. 6 may be contingent on successful verification of the digital signature of the frontend server. Similarly, the authentication server may digitally sign its communications to enable the frontend server to determine that such communications are authentic and that the communications originate from the authentication server. Other variations are also considered as being within the scope of the present disclosure.

Figure 7:
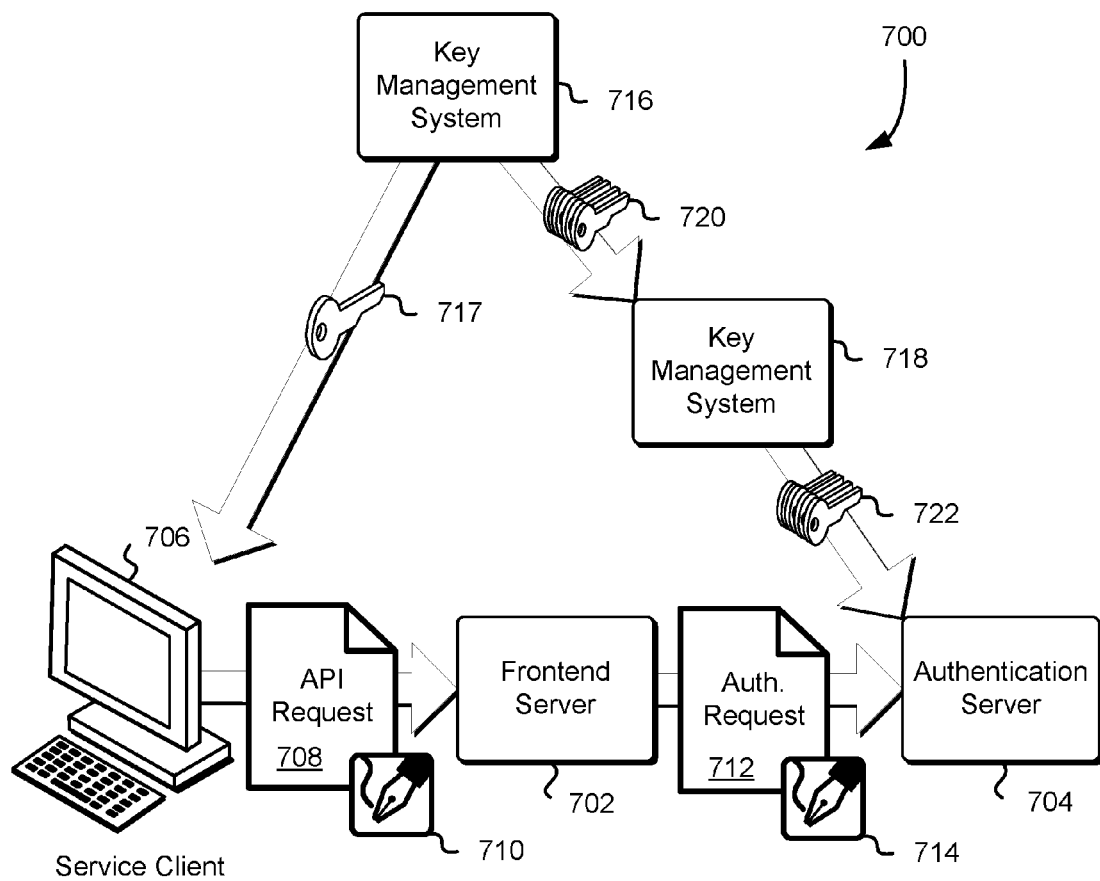
FIG. 7 shows an illustrative example of an environment in which various embodiments can be practiced.

As noted above, the techniques described herein are usable in a variety of computing environments. FIG. 7, accordingly, shows an illustrative example of an environment 700 in which various embodiments may be implemented. In this example, the environment 700 includes a frontend server 702 and an authentication server 704. The frontend server may be implemented to provide an application programming interface for accessing a service where resources of the service may be hosted using the computing device and/or other computing devices (not pictured). For example, the frontend server 702 may be a member of a fleet of client computing nodes, each node comprising a computing device. Similarly, the authentication server 704 may be a computing device configured to verify digital signatures using cryptographic keys provided to the authentication server. For example, the authentication server 704 may be a member of a fleet of authentication devices, each configured to perform various operations in connection with authentication, such as digital signature checking, cryptographic key derivation, and forward access session generation.

In various embodiments, the frontend server 702 and authentication server 704 are under the control of the same entity. In some examples, the frontend server 702 and authentication server 704 communicate over an isolated network that is under the control of the entity. The frontend server 702, in some embodiments, includes a web server that processes web service API requests to perform various operations in accordance with a service provider associated with the frontend server 702.

As discussed in more detail below, the frontend server 702 may communicate with the authentication server 704 for the purpose of verifying digital signatures of requests received by the frontend server 702. For example, in some embodiments, a service client 706 transmits a digitally signed API request 708 to the frontend server 702. The API request 708 may, for example, be a web service request configured to cause a service of the service provider to perform one or more corresponding operations. As the API request 708 is digitally signed, the API request may be transmitted by the service client 706 with a digital signature 710 which may be verified by the authentication server 704, such as described above. The frontend server 702 may process the API request 708 in various ways in accordance with various embodiments and the manner by which the frontend server processes API requests may vary in accordance with the type of service being provided and the particular type of request that is submitted. In some examples, the frontend server 702 performs some or all of fulfillment of the request itself. In other examples, the frontend server 702 causes one or more other computing devices to perform a role in fulfillment of the request. In some embodiments, a request is fulfilled by the frontend server 702 triggering a workflow comprising operations performed by one or more other computing devices. Other variations are also considered as being within the scope of the present disclosure.

In various embodiments, a authentication request 712 from the frontend server 702 to the authentication server 704 is digitally signed using a cryptographic key corresponding to the frontend server and, therefore, the frontend server 702 transmits the authentication request 712 with a digital signature 714 of the authentication request 712. The authentication server 704 may verify the digital signature 714 using a key associated with the frontend server (e.g., a symmetric cryptographic key corresponding to the frontend server 702 or a public cryptographic key corresponding to a private cryptographic key of the frontend server 702) and operate with successful verification of the digital signature 715 as a condition for providing a verification response indicating whether the digital signature 710 of the service client 706 is valid.

As noted above, the keys used to verify digital signatures and generate digital signatures may be provided to the systems that performed digital signature verification and generation. Accordingly, as illustrated in FIG. 7, the environment 700 includes a first key management system 716 and a second key management system 718. In some embodiments, the first key management system 716 has access to cryptographic keys shared with various service clients who may be customers of a computing resource service provider that provides the service.

As illustrated in FIG. 7, the first key management system 716 may provide a cryptographic key 717 to the service client 706 and store the cryptographic key 717 or another cryptographic key from which the cryptographic key 717 is derivable. The first key management system 716 and service client 706 may share the cryptographic key 717 in other ways, such as by the service client 706 providing the cryptographic key 717 to the first key management system 716, or by another system (not pictured) providing both the service client 706 and the first key management system 716 the cryptographic key 717. The transfer of cryptographic keys between entities may be performed in various ways, such as by transmission over an encrypted channel, by encrypting cryptographic key(s) to a public key of a recipient entity and transmitting the encrypted cryptographic key(s) to the entity, by physically transferring a computer-readable medium storing the cryptographic keys from one entity to the other, and the like.

The first key management system 716 may transmit keys derived from those shared cryptographic keys to second key management system 718. In one example, the first key management system 716 is a central key management system used to provide cryptographic keys to various subsystems of a distributed computing environment that is distributed among multiple regions. The second key management system 718 may comprise a key management system in a particular region (i.e., a regional key management system) and the keys 720 provided from the first key management system 716 to the second key management system 718 may be generated (i.e., derived from the clients of the service) so as to only be usable within the particular region of the second key management system 718. The second key management system 718 may use one or more of the received keys 720 to derive keys 722 that are provided to the frontend server 702 and the authentication server 704 to enable the frontend server and the authentication server 704 to perform signature verification and/or generation. The keys 722 may be generated from the keys 720 so as to have a smaller scope of use; that is, to be useable for a smaller set of uses for which the keys 722 are usable, such as described in more detail below. Generally, a first cryptographic key may have a larger scope of use than a second cryptographic key derived from the first cryptographic key because, in some embodiments: the second cryptographic key is sufficient to cause a first set of operations; the first cryptographic key is also usable to derive a third cryptographic key that the second cryptographic key is usable to derive; and the third cryptographic key is usable to cause at least one operation that the second cryptographic key is insufficient to cause. Additional details are discussed below.

It should be noted that FIG. 7 is illustrative in nature and that fewer or more key management systems may be used in various embodiments. For example, in some embodiments, a central key management system, for each of multiple regions, derives cryptographic keys and transmits the derived cryptographic keys to a key management system in a region. The regional key management system may use the derived cryptographic keys to derive keys for each of a plurality of services and provide the derived cryptographic keys to the service. Individual services may further derive cryptographic keys, e.g., for host computing devices of the service, and the like. Generally, the levels of cryptographic key derivation may vary in accordance with various embodiments.

Figure 8:
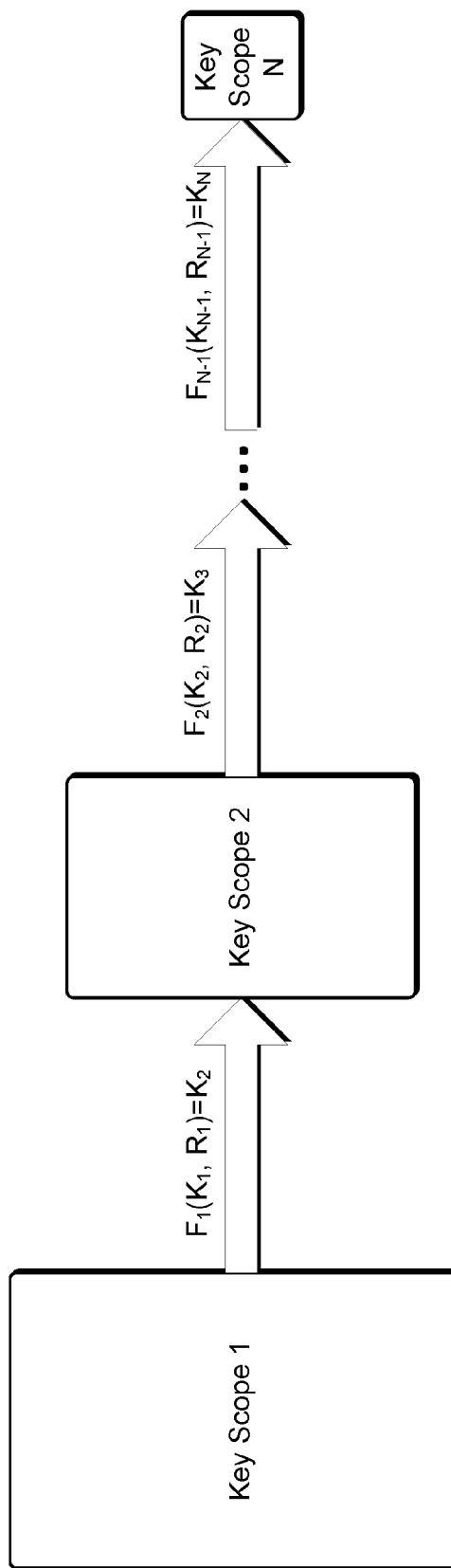
FIG. 8 shows an illustrative diagram demonstrating key derivation in accordance with at least one embodiment.

FIG. 8 shows an illustrative example of a diagram illustrating the scoping of cryptographic keys in a manner usable in accordance with various embodiments of the present disclosure. In an embodiment, a first key has a first key scope (labeled as "Key Scope 1" in the figure). The first key may, for instance, be a key shared as a secret between a computing resource service provider and a customer of the computing resource service provider or, generally, a key shared between two entities. The first key scope may correspond to a set of uses for which the first key is usable (e.g., a set of uses for which use of the first key is usable for successful authentication of messages). As an example, the first key may, through appropriate derivation, be usable in multiple regions of a computing resource service provider by using an encoding of each region to derive, from the first key, a suitable regional key.

Accordingly, as illustrated in FIG. 8, the first key may be used to derive a second key having a second key scope (labeled as "Key Scope 2"). While omitted from the drawing to avoid obscuring the illustration, the first key may be used to derive multiple second keys, each with a different second key scope. This second key may be used to derive a third key, which may be used to derive another key, and so on. To derive a series of keys one from another, the following formula, or variations thereof, may be used:

$$K_N = F_{N-1}(K_{N-1}, R_{N-1})$$

where $K_N$ is the Nth derived key (N being a positive integer), $F_{N-1}$ is a one-way function or otherwise based, at least in part, on a one-way function, such as a cryptographic hash function, message authentication code algorithm, or a key derivation function, described above, and $R_{N-1}$ is an encoding of a restriction. It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. Thus, the allowable scope of use for $K_N$ is the scope of use of $K_{N-1}$ restricted by the restriction corresponding to $R_{N-1}$. Each encoding of a restriction $R_i$ may be an encoding of a different restriction, such as described above and below. Each function $F_i$ may be the same function or different functions $F_i$ (for some or all different values of i) may be different. Values for R are considered restrictions because, due to the mathematical properties of the function(s) F, access to the values of R and output of $F_{N+1}$, without a cryptographic key used to generate the output of $F_{N+1}$ does not provide access to the cryptographic key. As a result, access to one or more resources may be managed by distributing derived cryptographic keys in according to the restrictions corresponding to the values of R. For example, a key management system may manage keys for multiple regions. A single root key may be used to derive multiple regional keys, each derived with a different value of R corresponding to a different region. Regional keys may be transferred to regional systems. In this manner, because of the manner in which regional keys are generated, a regional system (or other entity) with a corresponding regional key, without access to the root key used to generate the regional key, is unable to determine a regional key of another region without, for instance, extraordinary expenditure of computational resources necessary for a cryptographic (e.g., brute force) attack.

Figure 9:
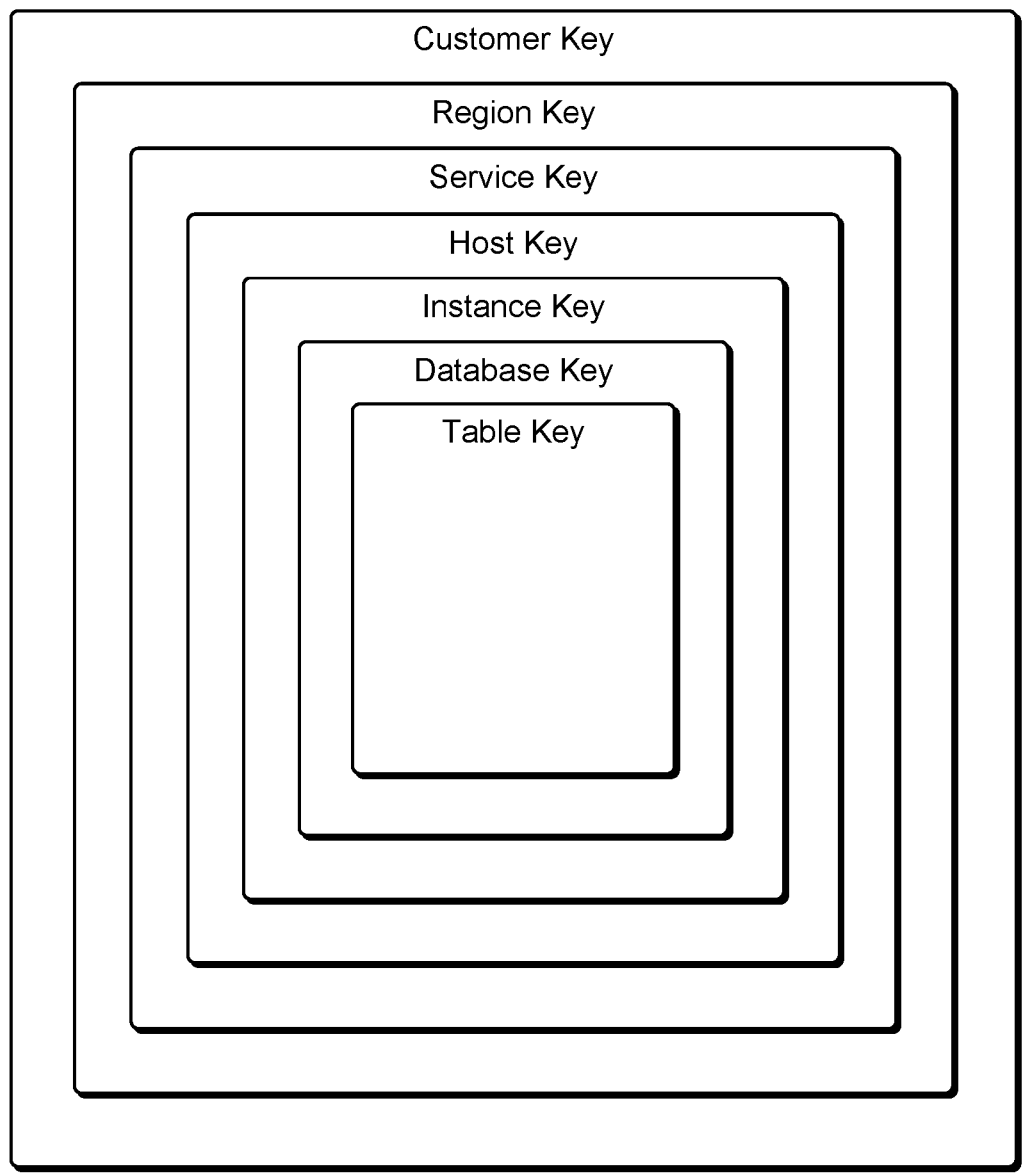
FIG. 9 shows a diagram illustrating scoping of cryptographic keys in accordance with at least one embodiment.

As discussed above, numerous types of restrictions may be used to scope cryptographic keys. FIG. 9, accordingly, shows an illustrative example of a diagram illustrating one way in which a cryptographic key may be scoped. In this particular example, a series of boxes appears where each box represents a scope of use of a cryptographic key. The boxes are arranged in a Venn diagram so that, if a first box is contained in a second box, set of uses for which a first cryptographic key is usable is a proper subset of a set of uses for which a second cryptographic key is usable, where the first cryptographic key is directly or indirectly derived from the second cryptographic key.

In this illustrative figure, a customer key may be a key shared between a computing resource service provider and a customer of the computing resource service provider. The customer key may be usable to validly digitally sign requests that the customer is authorized to make (i.e., requests that the customer is able to submit and cause to be fulfilled). It should be noted that, to be usable for all uses for which the customer is authorized, it may be necessary to use the key to derive another key that is used as a signing key. In various embodiments, the encodings of restrictions are public or otherwise available to the customer so that the customer (through an appropriate computing device) is able to derive a key appropriate for a particular use. For instance, to sign an API request to be transmitted to a particular region of the service provider, the customer may derive a signing key based at least in part on the encoding for the region. Such may be necessary, for example, when devices used to verify signatures in the region lack access to the customer key and, therefore, are unable to verify digital signatures generated directly using the customer key.

As illustrated, the customer key may be used to derive a region key, usable only within a particular region. The region key may be used to derive a service key, usable only to submit requests to a particular service operated in the region. The service key may be used to derive a host key, which may be a key usable only on a particular computing device (host). The host key may be used to derive an instance key, which may be a key usable only on a particular virtual machine instance supported by the host. The instance key may be used to derive a database key, which may be a key usable only for operations on a particular database. The database key may be a key usable only for operations on a particular table of the database (in embodiments where the database utilizes table structures). The particular restrictions and order in which keys are derived are illustrative in nature and various embodiments may utilize fewer restrictions and/or may perform key derivations in a different order than illustrated in the figure. Other restrictions may also be used, such as time-based restrictions, identity-based restrictions and, generally, any way by which a set of uses of a cryptographic key is restrictable.

The various keys and scopes represented in FIG. 9 (and variations thereof) may be derived in various ways in accordance with various embodiments. For example, different devices of different computer systems may perform the various derivations that ultimately result in a signing key being derived. For instance, a key management system may perform one derivation and transmit the result to another system which performs further derivation. In some examples, a device performing digital signature generation and/or digital signature verification may perform one or more derivations to obtain a signing (verifying) key. Features of a request and/or command may be used to determine which restrictions (e.g., which customer, which database, which table, which host, etc.) need to be used to perform one or more key derivations. Other variations are also considered as being within the scope of the present disclosure.

The above description mentions numerous cryptographic operations (e.g., encryption, decryption, digital signature generation, digital signature verification) that may be performed. Cryptographic operations that may be performed in various embodiments include, but are not limited to digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode. Symmetric key algorithms may also include those used to generate output of one way functions and include, but are not limited to algorithms that utilize hash-based message authentication codes (HMACs), message authentication codes (MACs) in general, PBKDF2 and Bcrypt.

Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

As discussed, variations of the techniques discussed above are considered as being within the scope of the present disclosure. For instance, the techniques described above include using a handshake protocol to establish a secure communication channel wherein messages are encrypted for communication over the channel. The secure communication channel can be used to wrap other protocols, such as by generating a message in accordance with a first protocol, encrypt that message, and transmit the encrypted message over the secure communication channel. When received, the encrypted message can be decrypted and the message may be further processed in accordance with the first protocol. Other variations are also considered as being within the scope of the present disclosure.

Figure 10:
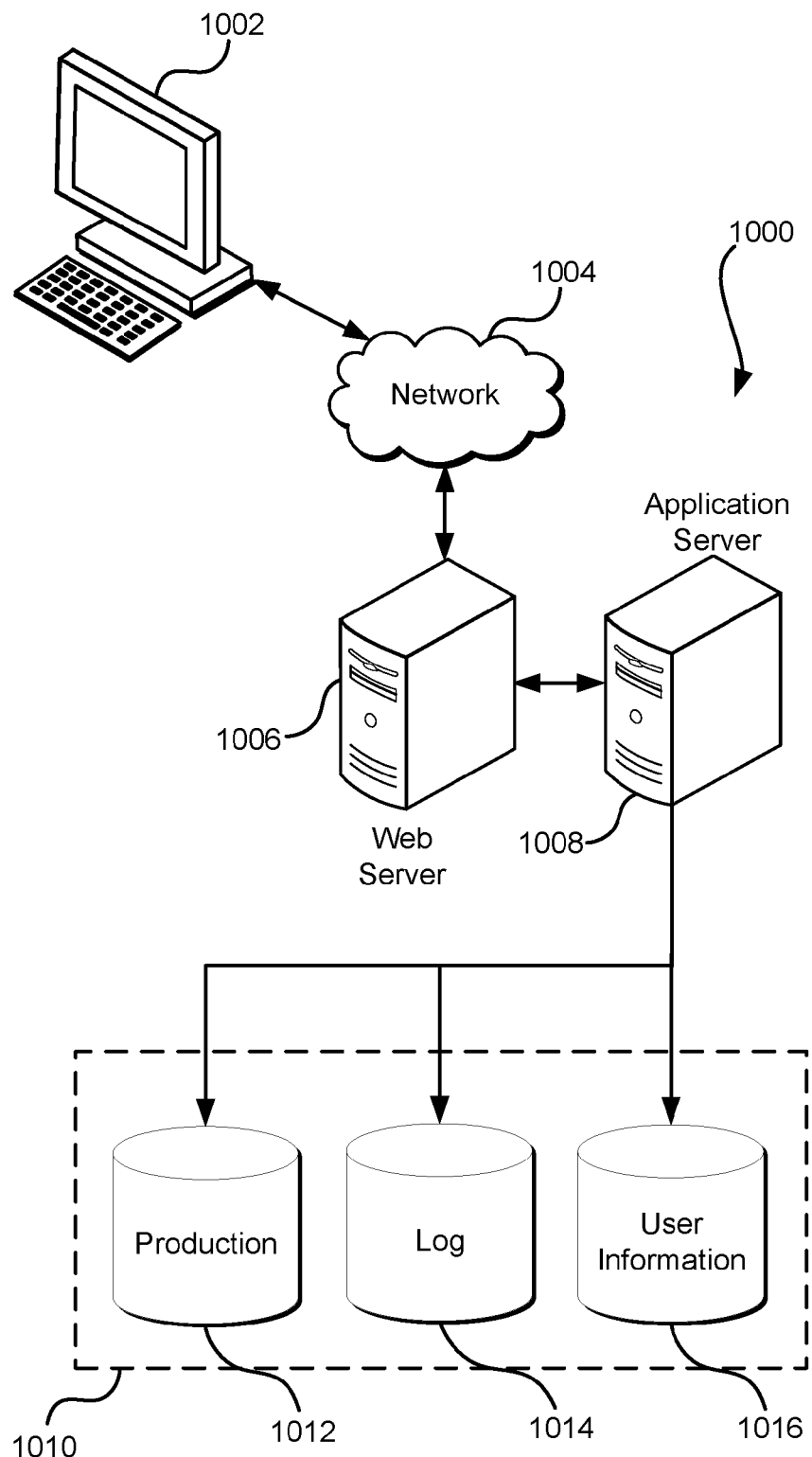
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a client computer system and in accordance with a communication protocol for establishing a secure communication channel, a message and a digital signature, the message specifying a set of key derivation parameters, the communication protocol comprising a handshake protocol;
    transmitting the message and the digital signature to an authentication server configured to verify authenticity of the message based at least in part on the digital signature and contingent on successful verification of the authenticity of the message, derive a pre-shared cryptographic key that is available to the client computer system and to provide the pre-shared cryptographic key;
    if the pre-shared cryptographic key is received from the authentication server, using
    the pre-shared cryptographic key to establish, as part of the handshake protocol, the secure communication channel with the client computer system to result in an established secure communication channel; and
    if the authentication server fails to provide the pre-shared cryptographic key from the authentication server, operate in accordance with the digital signature being unverified.

2. The computer-implemented method of claim 1, wherein using the pre-shared cryptographic key to establish the secure communication channel with the client computer system comprises deriving an encryption key in accordance with a protocol used to establish the secure communication channel and using the encryption key to transmit encrypted messages to the client computer system.

3. The computer-implemented method of claim 1, wherein:
    receiving the pre-shared key further comprises receiving, from the authentication server, a signing key; and
    the method further comprises using the signing key to verify a digital signature of a request received, over the established secure communication channel, from the client computer system.

4. The computer-implemented method of claim 3, wherein using the pre-shared cryptographic key to establish the secure communication channel comprises using a set of additional key-derivation parameters to derive another cryptographic key from the pre-shared cryptographic key.

5. The computer-implemented method of claim 1, wherein the method further comprises:
    storing a set of policies; and determining, based at least in part on the set of policies, whether to fulfill a request received over the established secure communication channel.

6. A system, comprising a set of computing devices configured to implement at least:
a first server that negotiates, in accordance with a handshake protocol, a secure communication channel with a client computer system by executing executable code that causes the first server to:
provide a message and a digital signature received from a client computer system to a second server;
if the digital signature matches the message:
receive, from the second server, a pre-shared key accessible to the client computer system; and
use the pre-shared key to transmit encrypted messages to the client computer system to communicate over the secure communication channel; and
if the digital signature fails to match the message, operate in accordance with the digital signature being unverified.

7. The system of claim 6, wherein:
the system further comprises the second server;
the second server and the client computer system both have access to a cryptographic key;
the message specifies a set of key derivation parameters; and
the second server is configured to derive, based at least in part on the key derivation parameters, the pre-shared key from the cryptographic key.

8. The system of claim 7, wherein the second server derives the pre-shared key iteratively where output of a first iteration is calculated based at least in part on a first key derivation parameter of the set of key derivation parameters and output of a second iteration is calculated based at least in part on the output of the first iteration and a second key derivation parameter of the set of key derivation parameters.

9. The system of claim 7, wherein:
the second server derives, based at least in part on the cryptographic key and a second set of key derivation parameters different from the set of key derivation parameters, second cryptographic key and provide the second cryptographic key with the with the pre-shared key; and
the first server receives the second cryptographic key and uses the second cryptographic key to verify at least one digital signature generated by the client computer system.

10. The system of claim 7, wherein:
the message specifies a key path, the key path specifying an order of operations to be performed in deriving the pre-shared key; and
the second server derives the pre-shared key in accordance with the key path.

11. The system of claim 6, wherein the handshake protocol is part of a version of transport layer security.

12. The system of claim 6, wherein the pre-shared key is inaccessible to the first server until the pre-shared key is received from the second server.

13. The system of claim 6, wherein the first server provides, to the second server, information sufficient to enable the second server to verify the digital signature based at least in part on multiple messages transmitted between the client computer system and the first server.

14. The system of claim 6, wherein the first server digitally signs information comprising the message and the digital signature thereby generating a second digital signature verifiable by the second server.

15. A non-transitory computer-readable storage medium having stored thereon instructions that, as a result of execution by one or more processors of a computer system, cause the computer system to implement a first server that:
negotiates, in accordance with a handshake protocol, a secure communication channel with a client computer system by at least:
providing a message and a digital signature received from a client computer system to a second server;
if the digital signature matches the message:
receiving, from the second server, a pre-shared key accessible to the client computer system; and
using the pre-shared key to transmit encrypted messages to the client computer system to communicate over the secure communication channel; and
if the digital signature fails to match the message, operating in accordance with the digital signature being unverified.

16. The non-transitory computer-readable storage medium of claim 15, wherein the message specifies a set of key derivation parameters usable to derive the pre-shared key from another cryptographic key.

17. The non-transitory computer-readable storage medium of claim 15, wherein the instructions further cause the first server to receive, from the second server, a second cryptographic key and use the second cryptographic key to verify a digital signature.

18. The non-transitory computer-readable storage medium of claim 15, wherein the message specifies a key path, the key path specifying an order of operations to be performed to derive the pre-shared key.

19. The non-transitory computer-readable storage medium of claim 15, wherein the instructions are configured such that the first server lacks access to the pre-shared key at a time when the first server sends the message to the second server.

20. The non-transitory computer-readable storage medium of claim 15, wherein the instructions further cause the computer system to provide, to the second server, information based at least in part on multiple messages transmitted between the client computer system and the first server, the information enabling the second server to verify the digital signature.

* * * * *